US012525378B2

(12) United States Patent
Chang et al.

(10) Patent No.: US 12,525,378 B2
(45) Date of Patent: Jan. 13, 2026

(54) MAGNETIC DEVICE, POWER CONVERSION MODULE AND MANUFACTURING METHOD OF MAGNETIC DEVICE

(71) Applicant: Delta Electronics, Inc., Taoyuan (TW)

(72) Inventors: Xueliang Chang, Taoyuan (TW); Shengli Lu, Taoyuan (TW); Junguo Cui, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 828 days.

(21) Appl. No.: 17/884,352

(22) Filed: Aug. 9, 2022

(65) Prior Publication Data
US 2023/0057462 A1    Feb. 23, 2023

(30) Foreign Application Priority Data
Aug. 19, 2021    (CN) .......................... 202110953719.7

(51) Int. Cl.
*H01F 3/08*    (2006.01)
*H01F 41/02*    (2006.01)
*H02M 1/00*    (2007.01)

(52) U.S. Cl.
CPC ........... *H01F 3/08* (2013.01); *H01F 41/0246* (2013.01); *H02M 1/0043* (2021.05)

(58) Field of Classification Search
CPC .............. H01F 3/08; H01F 27/244; H01F 5/04
USPC ................................................. 336/233, 221
See application file for complete search history.

(56) References Cited

U.S. PATENT DOCUMENTS

| | | | | |
|---|---|---|---|---|
| 9,263,177 | B1* | 2/2016 | Ikriannikov | ........ H01F 17/0013 |
| 2011/0279100 | A1* | 11/2011 | Ikriannikov | .......... H02M 7/003 336/220 |
| 2013/0099886 | A1* | 4/2013 | Yan | ...................... H01F 27/303 336/192 |
| 2017/0047155 | A1* | 2/2017 | Yao | .......................... H01F 3/10 |
| 2020/0194161 | A1* | 6/2020 | Hu | .......................... H01F 17/04 |

FOREIGN PATENT DOCUMENTS

| | | |
|---|---|---|
| CN | 112509783 A | 3/2021 |
| CN | 113380516 A | 9/2021 |
| CN | 115020081 A | 9/2022 |

* cited by examiner

*Primary Examiner* — Shawki S Ismail
*Assistant Examiner* — Joselito S. Baisa
(74) *Attorney, Agent, or Firm* — KIRTON McCONKIE; Evan R. Witt

(57) ABSTRACT

A magnetic device includes a first conductive structure, a second conductive structure and a magnetic core formed of a powder magnetic material. The first conductive structure includes a first connection part, a first conductive body and a second connection part. The first conductive body is connected between the first connection part and the second connection part. The second conductive structure includes a third connection part, a second conductive body and a fourth connection part. The powder magnetic material, the first conductive structure and the second conductive structure are laminated together. The first conductive structure and the second conductive structure are embedded in the magnetic core. The first connection part and the third connection part are exposed to the fifth surface. The second connection part and the fourth connection part are exposed to the sixth surface.

27 Claims, 34 Drawing Sheets

```
┌──────────────────────────────────────────────────────────┐
│ A first conductive structure and a second conductive structure are │
│ provided, wherein the first conductive structure comprises a first │
│ connection part, a first conductive body and a second connection part, │
│ the first conductive body is connected between the first connection part │─ S1
│ and the second connection part, the second conductive structure │
│ comprises a third connection part, a second conductive body and a │
│ fourth connection part, and the second conductive body is connected │
│ between the third connection part and the fourth connection part. │
└──────────────────────────────────────────────────────────┘
                              │
                              ▼
┌──────────────────────────────────────────────────────────┐
│ A powder magnetic material is provided, and the powder magnetic │
│ material, the first conductive structure and the second conductive │
│ structure are laminated together to form a first surface, a second surface, │
│ a third surface, a fourth surface, a fifth surface and sixth surface of the │─ S2
│ magnetic device, wherein the first surface and the third surface are │
│ opposed to each other, the second surface and the fourth surface are │
│ opposed to each other, and the fifth surface and the sixth surface are │
│ opposed to each other. │
└──────────────────────────────────────────────────────────┘
                              │
                              ▼
┌──────────────────────────────────────────────────────────┐
│ The powder magnetic material is milled, so that the first connection part │
│ and the third connection part are exposed to the fifth surface and the │
│ second connection part and the fourth connection part are exposed to │
│ the sixth surface, wherein the first connection part and the second │
│ connection part are respectively exposed to any two of the first surface, │─ S3
│ the second surface, the third surface and the fourth surface, and the │
│ third connection part and the fourth connection part are respectively │
│ exposed to any two of the first surface, the second surface, the third │
│ surface and the fourth surface. │
└──────────────────────────────────────────────────────────┘
                              │
                              ▼
┌──────────────────────────────────────────────────────────┐
│ A first electroplating structure is formed on the fifth surface, the second │
│ surface and the sixth surface, and a second electroplating structure is │─ S4
│ formed on the fifth surface, the fourth surface and the sixth surface. │
└──────────────────────────────────────────────────────────┘
```

FIG. 3C

| A first conductive structure and a second conductive structure are provided, wherein the first conductive structure comprises a first connection part, a first conductive body and a second connection part, the first conductive body is connected between the first connection part and the second connection part, the second conductive structure comprises a third connection part, a second conductive body and a fourth connection part, and the second conductive body is connected between the third connection part and the fourth connection part. | — S1 |

| A powder magnetic material is provided, and the powder magnetic material, the first conductive structure and the second conductive structure are laminated together to form a first surface, a second surface, a third surface, a fourth surface, a fifth surface and sixth surface of the magnetic device, wherein the first surface and the third surface are opposed to each other, the second surface and the fourth surface are opposed to each other, and the fifth surface and the sixth surface are opposed to each other. | — S2 |

| The powder magnetic material is milled, so that the first connection part and the third connection part are exposed to the fifth surface and the second connection part and the fourth connection part are exposed to the sixth surface, wherein the first connection part and the second connection part are respectively exposed to any two of the first surface, the second surface, the third surface and the fourth surface, and the third connection part and the fourth connection part are respectively exposed to any two of the first surface, the second surface, the third surface and the fourth surface. | — S3 |

| A first electroplating structure is formed on the fifth surface, the second surface and the sixth surface, and a second electroplating structure is formed on the fifth surface, the fourth surface and the sixth surface. | — S4 |

| The portion of the first electroplating structure on the second surface and the portion of the second electroplating structure on the fourth surface are coated with protective materials. | — S5 |

FIG. 3D

MAGNETIC DEVICE, POWER CONVERSION MODULE AND MANUFACTURING METHOD OF MAGNETIC DEVICE

CROSS-REFERENCE TO RELATED APPLICATION

This application claims priority to China Patent Application No. 202110953719.7, filed on Aug. 19, 2021, the entire contents of which are incorporated herein by reference for all purposes.

FIELD OF THE INVENTION

The present disclosure relates to a magnetic device and a power conversion module with the magnetic device, and more particularly to a magnetic device with small volume and a power conversion module with the magnetic device.

BACKGROUND

With the rapid development of mobile communication technologies and cloud computing technologies, power conversion modules have also been widely used in communication products and data centers. Due to the high power and miniaturization of the communication products, it is a challenge for the power conversion modules to increase the power conversion efficiency, reduce the volume and increase the heat dissipation efficiency. Therefore, it is the current industry trend to design a reasonable structure and layout for the power conversion module and the magnetic device used in the power conversion module to improve power conversion efficiency, reduce volume and reduce thermal resistance.

Generally, a two-phase interleaved parallel-connected buck converter has the advantages of small output current ripple, small output filter volume and large system output power. Consequently, the two-phase interleaved parallel-connected buck converter is widely used in power conversion modules. The two-phase interleaved parallel-connected buck converter uses winding-coupled magnetic devices, i.e., coupled inductors. Consequently, the ripple amplitude of the output current from the power conversion module can be further reduced, and the dynamic response characteristics of the power conversion module can be enhanced.

Generally, the core loss of the magnetic device in the power conversion module is relatively large, and the volume of the magnetic device constituting the inductor is relatively large. Therefore, it is important to reduce the volume of the magnetic device and reduce the loss of the magnetic device in order to increase the power conversion efficiency of the power conversion module.

The conventional power conversion module includes a main frame and a magnetic device. The main frame is composed of a printed circuit board. Generally, the magnetic device includes an E-shaped core and a winding assembly. The E-shaped core is embedded within the main frame. Consequently, an inductor is formed. However, since the height tolerance of the E-shaped core is large and the height tolerance of the main frame formed by the printed circuit board is also large, the overall height tolerance of the power conversion module is large, and the effective volume is small. Under this circumstance, the core loss of the magnetic device is large, and the conducting loss of the winding assembly of the magnetic device is large. Consequently, the inductor saturation phenomenon of the magnetic device easily occurs.

Therefore, there is a need of providing an improved magnetic device and an improved power conversion module in order to overcome the drawbacks of the conventional technologies.

SUMMARY

The present disclosure provides a magnetic device with small volume and a power conversion module with the magnetic device.

In accordance with an aspect of present disclosure, a magnetic device is provided. The magnetic device includes a first conductive structure, a second conductive structure, a magnetic core formed of a powder magnetic material, a first electroplating structure and a second electroplating structure. The first conductive structure includes a first connection part, a first conductive body and a second connection part. The first conductive body is connected between the first connection part and the second connection part. The second conductive structure includes a third connection part, a second conductive body and a fourth connection part. The second conductive body is connected between the third connection part and the fourth connection part. The powder magnetic material, the first conductive structure and the second conductive structure are laminated together to form a first surface, a second surface, a third surface, a fourth surface, a fifth surface and a sixth surface of the magnetic device. The first conductive structure and the second conductive structure are embedded in the magnetic core. The first surface and the third surface are opposed to each other. The second surface and the fourth surface are opposed to each other. The fifth surface and the sixth surface are opposed to each other. The first connection part and the third connection part are exposed to the fifth surface. The second connection part and the fourth connection part are exposed to the sixth surface. The first connection part and the second connection part are further exposed to any two of the first surface, the second surface, the third surface and the fourth surface. The third connection part and the fourth connection part are further exposed to any two of the first surface, the second surface, the third surface and the fourth surface. The first electroplating structure is formed on the fifth surface, the second surface and the sixth surface. The second electroplating structure is formed on the fifth surface, the fourth surface and the sixth surface.

In accordance with another aspect of present disclosure, a power conversion module is provided. The power conversion module includes a first circuit board, a magnetic device and two switch components. The first circuit board has a first surface and a second surface, which are opposed to each other. The structure of the magnetic device is the same as described above. The fifth surface of the magnetic device is bonded to the second surface of the first circuit board. The two switch components are disposed on the first circuit board. The two switch components are respectively connected with the first connection part of the first conductive structure and the third connection part of the second conductive structure through conductive traces in the first circuit board.

In accordance with another aspect of present disclosure, a manufacturing process of a magnetic device is provided. In a step (a), a first conductive structure and a second conductive structure are provided. The first conductive structure includes a first connection part, a first conductive body and a second connection part. The first conductive body is connected between the first connection part and the second connection part. The second conductive structure includes a third connection part, a second conductive body and a fourth connection part. The second conductive body is connected between the third connection part and the fourth connection part. In a step (b), a powder magnetic material is provided, and the powder magnetic material, the first conductive structure and the second conductive structure are laminated together to form a first surface, a second surface, a third surface, a fourth surface, a fifth surface and a sixth surface of the magnetic device. The first conductive structure and the second conductive structure are embedded in the powder magnetic material. The first surface and the third surface are opposed to each other. The second surface and the fourth surface are opposed to each other. The fifth surface and the sixth surface are opposed to each other. In a step (c), the powder magnetic material is milled. After the powder magnetic material is milled, the first connection part and the third connection part are exposed to the fifth surface of the magnetic device, the second connection part and the fourth connection part are exposed to the sixth surface of the magnetic device, the first connection part and the second connection part are exposed to any two of the first surface, the second surface, the third surface and the fourth surface of the magnetic device, and the third connection part and the fourth connection part are exposed to any two of the first surface, the second surface, the third surface and the fourth surface of the magnetic device. In a step (d), a first electroplating structure is formed on the fifth surface, the second surface and the sixth surface of the magnetic device, and a second electroplating structure is formed on the fifth surface, the fourth surface and the sixth surface of the magnetic device.

The above contents of the present disclosure will become more readily apparent to those ordinarily skilled in the art after reviewing the following detailed description and accompanying drawings, in which:

BRIEF DESCRIPTION OF THE DRAWINGS

FIG. 3C is a flowchart illustrating a process of manufacturing the magnetic device as shown in FIG. 3A;

FIG. 3D is a flowchart illustrating another process of manufacturing the magnetic device as shown in FIG. 3A;

DETAILED DESCRIPTION

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
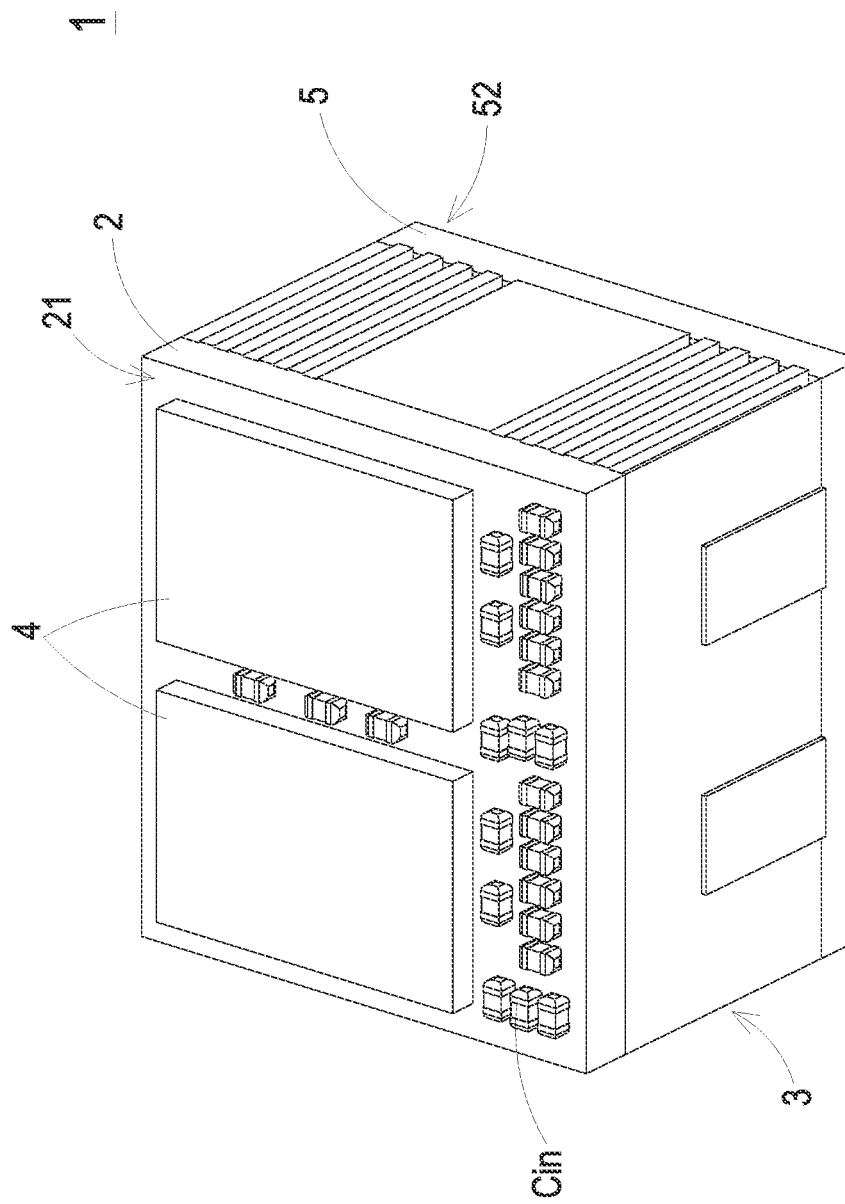
FIG. 1A is a schematic assembled view illustrating a power conversion module according to a first embodiment of the present disclosure.
Figure 1B:
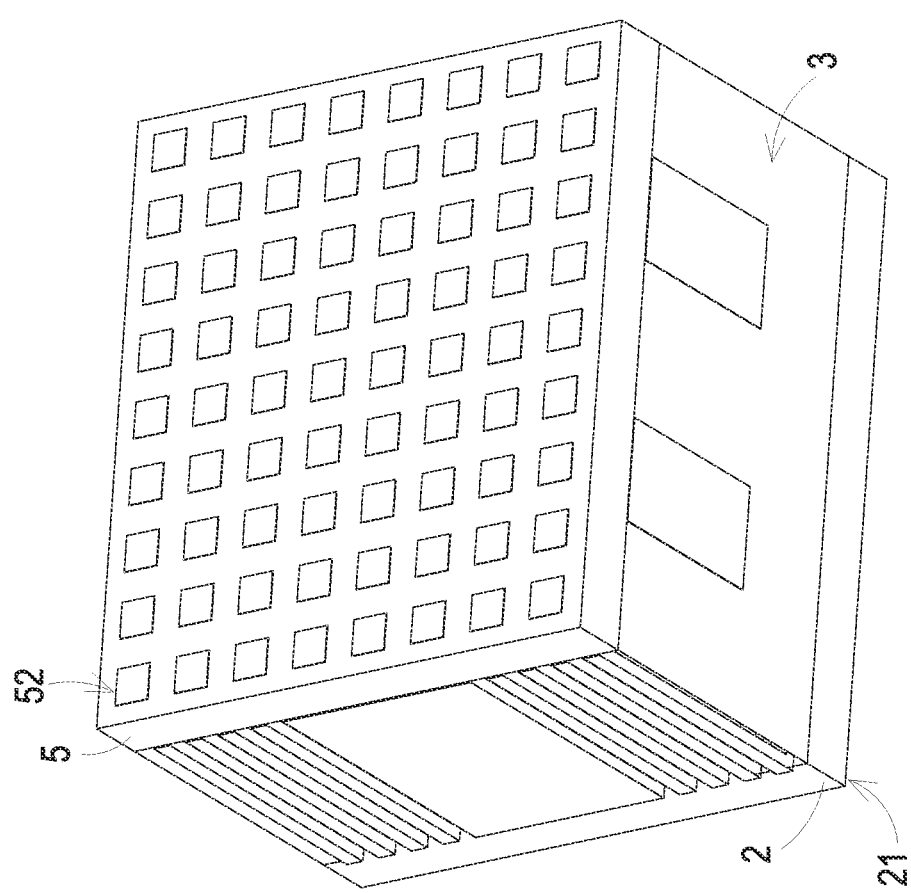
FIG. 1B is a schematic assembled view illustrating the power conversion module as shown in FIG. 1A and taken along another viewpoint.
Figure 1C:
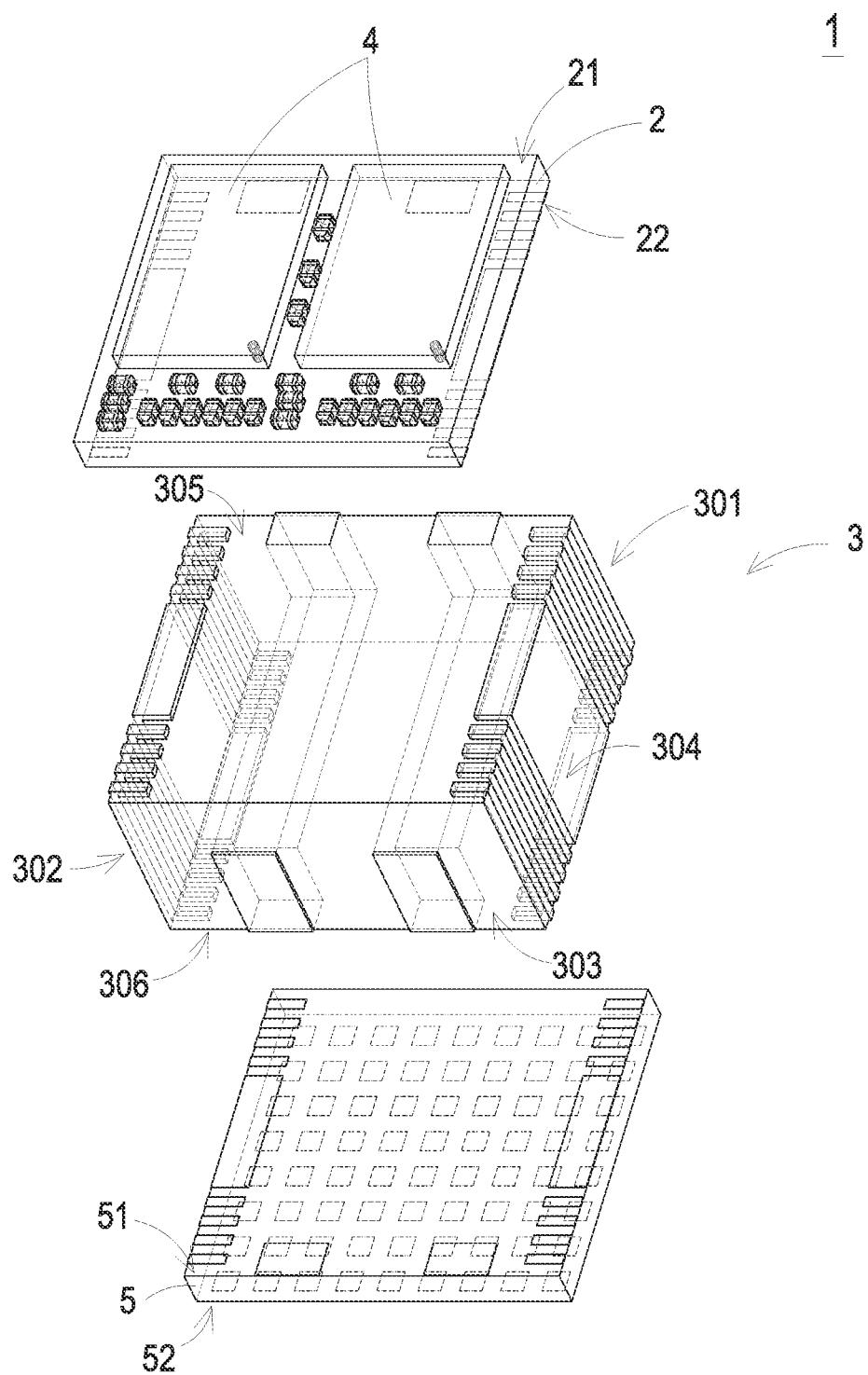
FIG. 1C is a schematic exploded view illustrating the power conversion module as shown in FIG. 1A.
Figure 1D:
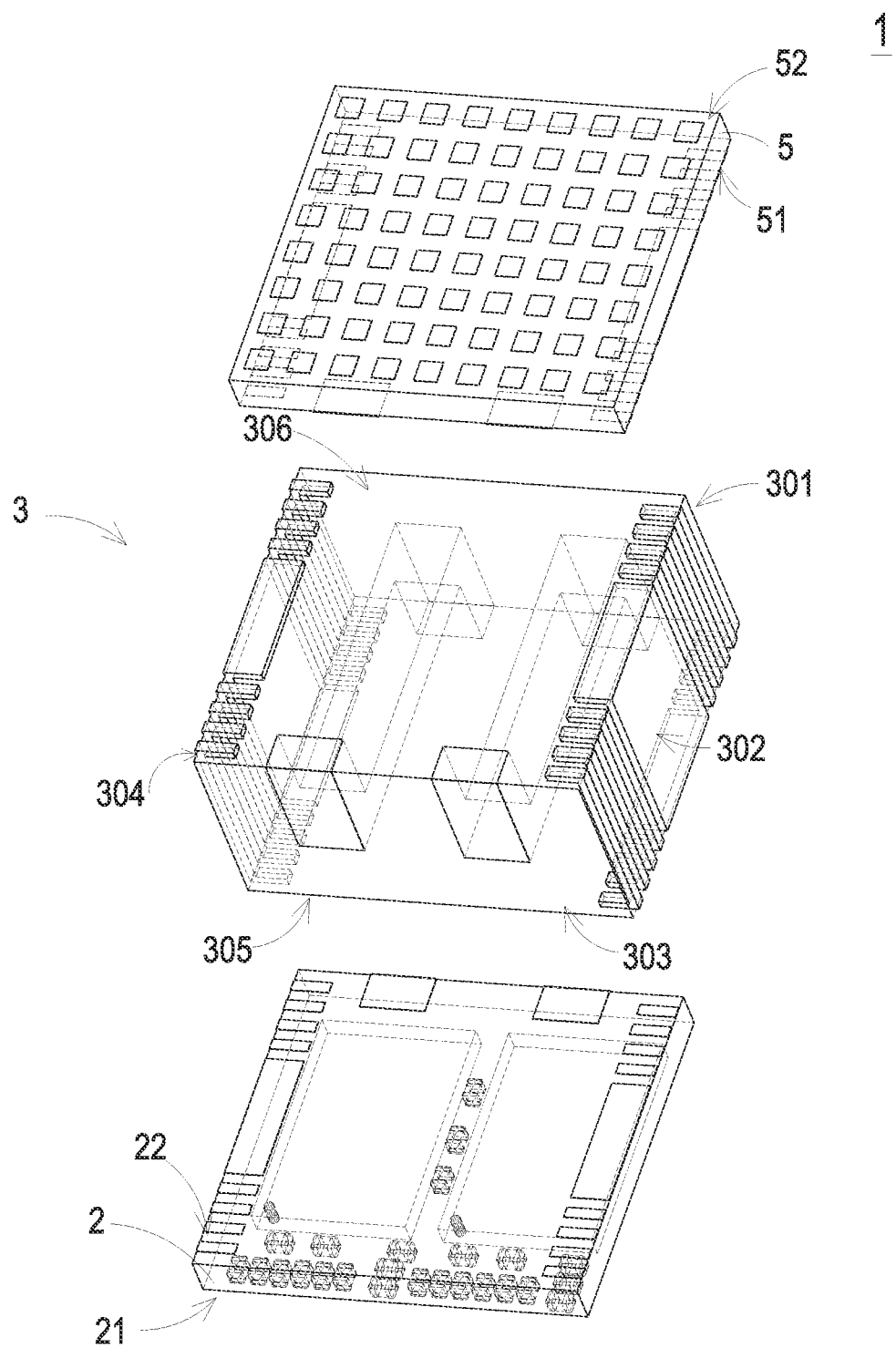
FIG. 1D is a schematic exploded view illustrating the power conversion module as shown in FIG. 1C and taken along another viewpoint.
Figure 2:
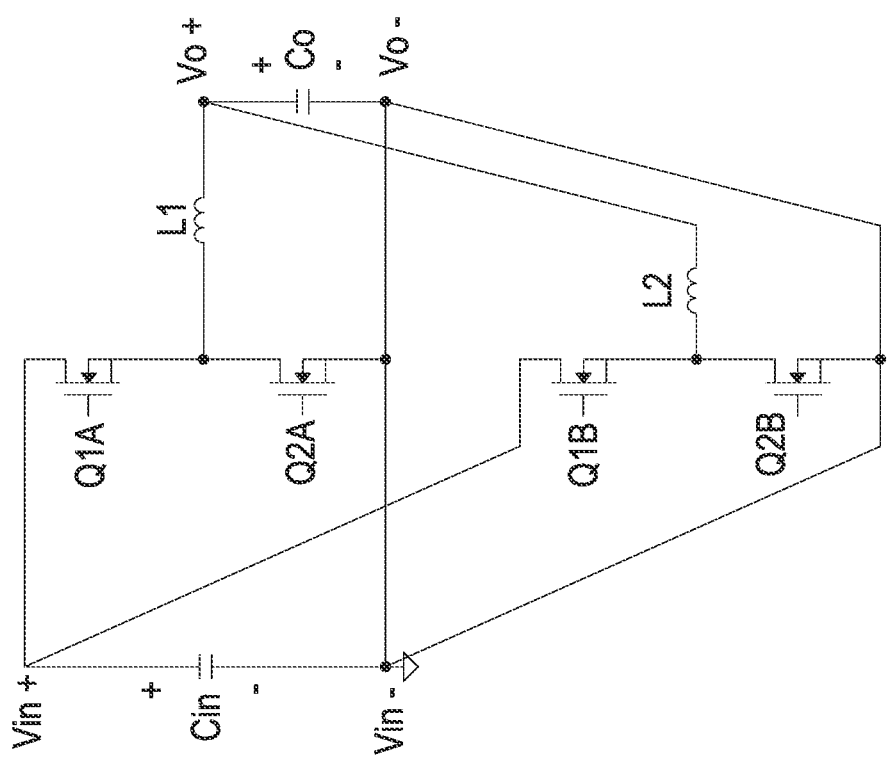
FIG. 2 is a schematic circuit diagram illustrating a circuitry structure of the power conversion module as shown in FIG. 1A.
Figure 3A:
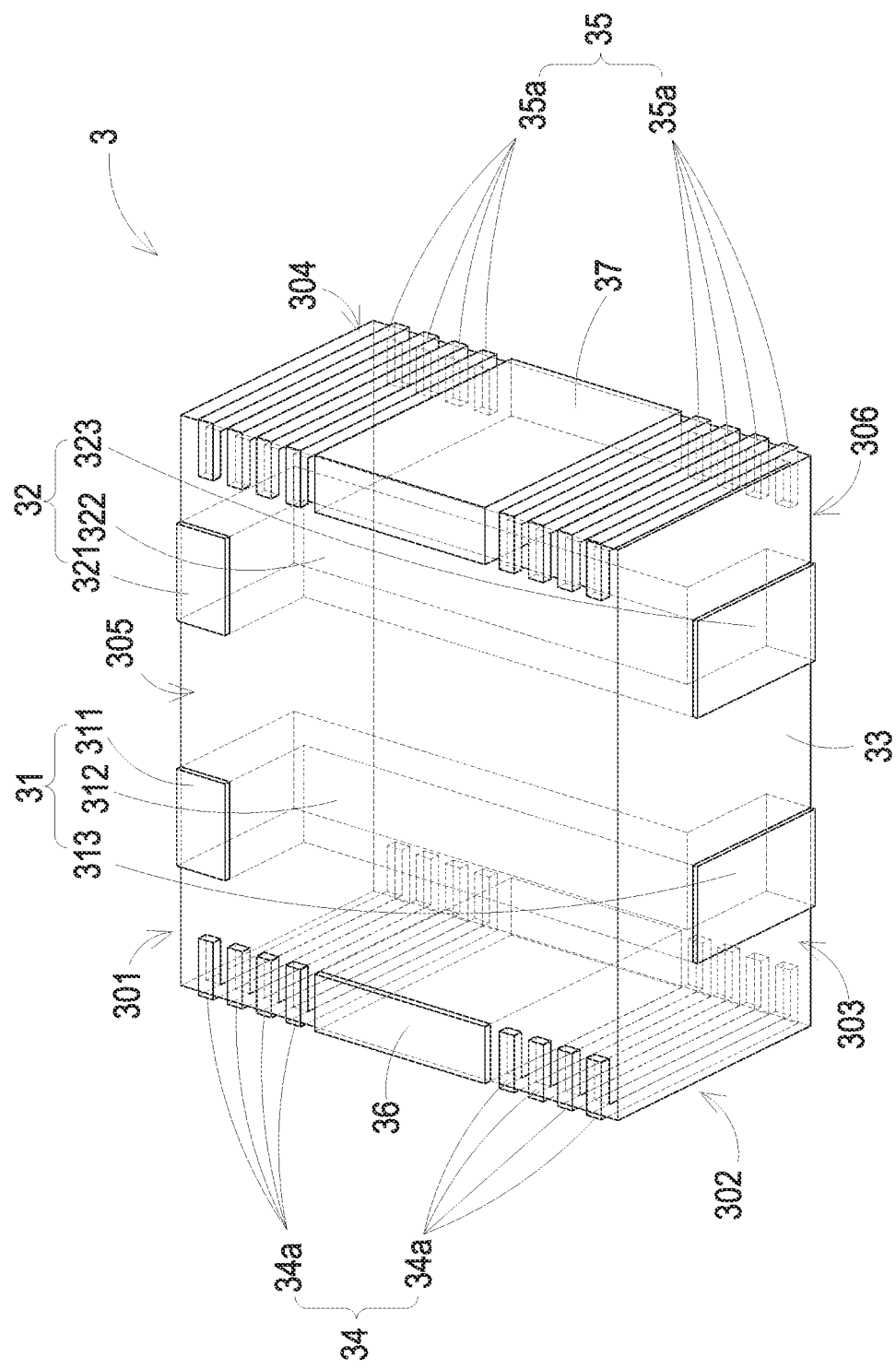
FIG. 3A is a schematic perspective view illustrating a first exemplary structure of the magnetic device of the power conversion module as shown in FIG. 1A.
Figure 3B:
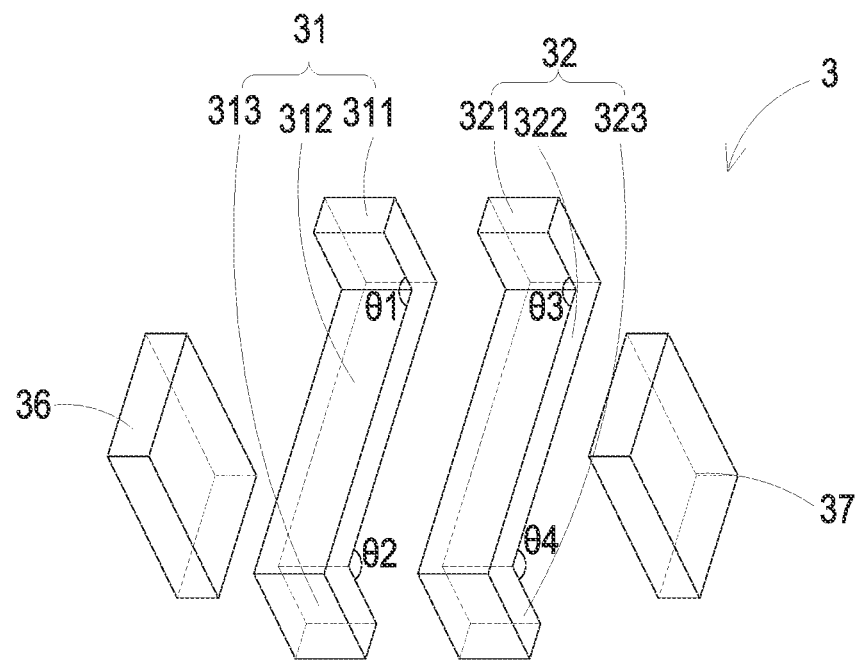
FIG. 3B is a schematic exploded view illustrating the magnetic device as shown in FIG. 3A.
Figure 3B:
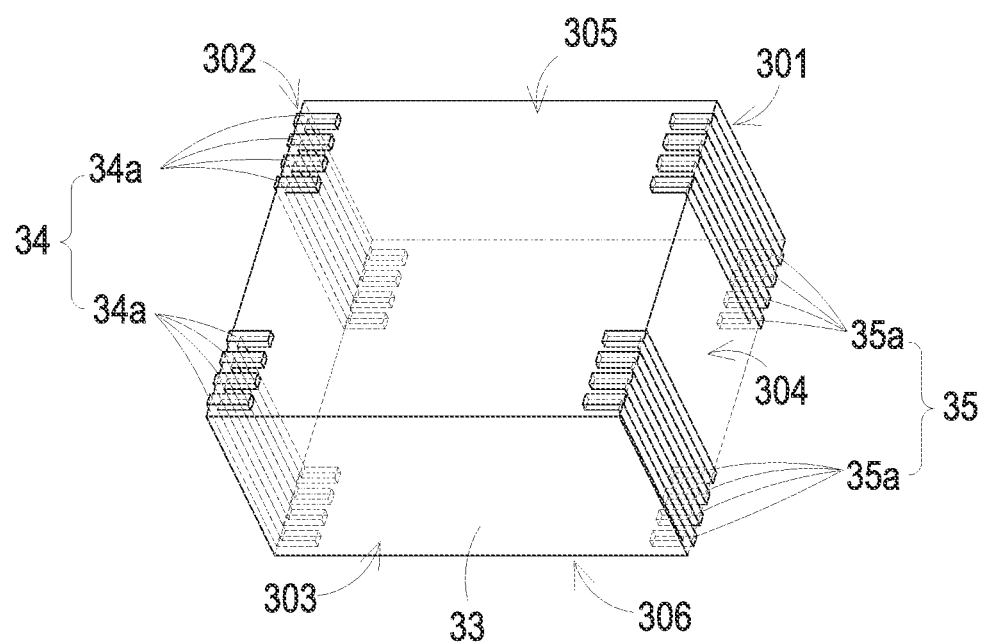

FIG. 1A is a schematic assembled view illustrating a power conversion module according to a first embodiment of the present disclosure. FIG. 1B is a schematic assembled view illustrating the power conversion module as shown in FIG. 1A and taken along another viewpoint. FIG. 1C is a schematic exploded view illustrating the power conversion module as shown in FIG. 1A. FIG. 1D is a schematic exploded view illustrating the power conversion module as shown in FIG. 1C and taken along another viewpoint. FIG. 2 is a schematic circuit diagram illustrating a circuitry structure of the power conversion module as shown in FIG. 1A. FIG. 3A is a schematic perspective view illustrating a first exemplary structure of the magnetic device of the power conversion module as shown in FIG. 1A. FIG. 3B is a schematic exploded view illustrating the magnetic device as shown in FIG. 3A.

In an embodiment, the power conversion module 1 is an interleaved parallel-connected buck converter. As shown in the circuitry structure of FIG. 2, the power conversion module 1 includes an input positive terminal Vin+, an input negative terminal Vin−, an output positive terminal Vo+, an output negative terminal Vo−, an input capacitor Cin, four switches Q1A, Q2A, Q1B, Q2B, a first inductor L1, a second inductor L2 and an output capacitor Co. The input negative terminal Vin− and the output negative terminal Vo− are connected with each other. The input capacitor Cin is electrically connected between the input positive terminal Vin+ and the input negative terminal Vin−. The switches Q1A and Q2A are connected to each other and collaboratively formed as a first half-bridge arm. The first half-bridge arm is electrically connected between the input positive terminal Vin+ and the input negative terminal Vin−. A closed loop is defined by the first half-bridge arm and the input capacitor Cin collaboratively. The switches Q1B and Q2B are connected to each other and collaboratively formed as a second half-bridge arm. The second half-bridge arm is electrically connected between the input positive terminal Vin+ and the input negative terminal Vin−. Another closed loop is defined by the second half-bridge arm and the input capacitor Cin collaboratively. The second half-bridge arm is connected with the first half-bridge arm in parallel. The phase difference between the two signals for driving the first half-bridge arm and the second half-bridge arm is 180 degrees. The first terminal of the first inductor L1 is electrically connected with the midpoint of the first half-bridge arm. The second terminal of the first inductor L1 is electrically connected with the output positive terminal Vo+. The first terminal of the second inductor L2 is electrically connected with the midpoint of the second half-bridge arm. The second terminal of the second inductor L2 is electrically connected with the output positive terminal Vo+. The output capacitor Co is electrically connected between the output positive terminal Vo+ and the output negative Vo−.

The first inductor L1 and the second inductor L2 are coupled to each other. Consequently, the output current ripple from the first half-bridge arm and the output current ripple from the second half-bridge arm are reduced, and the dynamic response of the power conversion module 1 is enhanced.

Please refer to FIGS. 1A, 1B, 1C and 1D again. In this embodiment, the power conversion module 1 is disposed on a system board (not shown). The power conversion module 1 includes a first circuit board 2, a magnetic device 3, two switch components 4, an input capacitor Cin and a second circuit board 5. The first circuit board 2 has a first surface 21 and a second surface 22, which are opposed to each other. The magnetic device 3 is used as the first inductor L1 and the second inductor L2 as shown in FIG. 2. The magnetic device 3 has a first surface 301, a second surface 302, a third surface 303, a fourth surface 304, a fifth surface 305 and a sixth surface 306. The first surface 301 and the third surface 303 are opposed to each other. The second surface 302 and the fourth surface 304 are opposed to each other. The fifth surface 305 and the sixth surface 306 are opposed to each other. The first surface 301, the second surface 302, the third latera side 303, the fourth surface 304 are arranged between the fifth surface 305 and the sixth surface 306. The fifth surface 305 of the magnetic device 3 is bonded to the second surface 22 of the first circuit board 2. The two switch components 4 include the switches of the first half-bridge arm (i.e., the switches Q1A and Q2A) and the switches of the second half-bridge arm (i.e., the switches Q1B and Q2B). The two switch components 4 are disposed on the first surface 21 of the first circuit board 2. The two switch components 4 are electrically connected with the magnetic device 3 through conductive traces in the first circuit board 2. During the operations of the power conversion module 1, the switch components 4 generate a great deal of heat. For removing heat, the power conversion module 1 is additionally equipped with heat sinks (not shown). Further, the heat sinks are located near the corresponding switch components 4. Since the distance between the heat sink and the corresponding switch component 4 is short and the thermal resistance is low, the temperature of the corresponding switch component 4 is effectively reduced. Consequently, the overall temperature of the power conversion module 1 is decreased. The input capacitor Cin is disposed on the first surface 21 of the first circuit board 2 and located beside the two switch components 4. The input capacitor Cin is electrically connected with the switch components 4 through the conductive traces in the first circuit board 2. The second circuit board 5 has a first surface 51 and a second surface 52, which are opposed to each other. The first surface 51 of the second circuit board 5 is attached on the sixth surface 306 of the magnetic device 3. In other words, the second circuit board 5 and the first circuit board 2 are disposed on the two opposite sides of the magnetic device 3, respectively. The second circuit board 5 and the first circuit board 2 are electrically connected with each other through the magnetic device 3. The second circuit board 5 is disposed on the system board through the second surface 52.

Please refer to FIGS. 3A and 3B. The structure of the magnetic device 3 will be described as follows. The magnetic device 3 includes a first conductive structure 31, a second conductive structure 32, a powder magnetic material 33, a first electroplating structure 34, a second electroplating structure 35, a third conductive structure 36 and a fourth conductive structure 37.

The first conductive structure 31 is formed by using a pre-forming process. The first conductive structure 31 is used as a first winding of the magnetic device 3 in order to transfer power signals. The first conductive structure 31 includes a first connection part 311, a first conductive body 312 and the second connection part 313. The first connection part 311 is the input terminal of the first conductive structure 31. The first connection part 311 is located beside the first surface 301 and the fifth surface 305 of the magnetic device 3. In addition, a portion of the first connection part 311 is exposed to the first surface 301 and the fifth surface 305 of the magnetic device 3. The first connection part 311 is extended in the direction from the fifth surface 305 of the magnetic device 3 to the sixth surface 306 of the magnetic device 3. The first conductive body 312 is connected between the first connection part 311 and the second connection part 313. A first end of the first conductive body 312 is connected with the first connection part 311. The first conductive body 312 is extended in the direction from the first surface 301 of the magnetic device 3 to the third surface 303 of the magnetic device 3. As shown in FIG. 3B, the angle $\theta 1$ between the first conductive body 312 and the first connection part 311 is in the range between 60 degrees and the 120 degrees. In this embodiment, the angle $\theta 1$ between the first conductive body 312 and the first connection part 311 is 90 degrees. Consequently, the first conductive body 312 is in parallel with the fifth surface 305 and the sixth surface 306 of the magnetic device 3. The second connection part 313 is an output terminal of the first conductive structure 31. In this embodiment, the second connection part 313 is located beside the third surface 303 and the sixth surface 306 of the magnetic device 3. In addition, the second connection part 313 is exposed to the third surface 303 and the sixth surface 306 of the magnetic device 3. The second connection part 313 is connected with a second end of the first conductive body 312. The second connection part 313 is extended in the direction from the fifth surface 305 of the magnetic device 3 to the sixth surface 306 of the magnetic device 3. As shown in FIG. 3B, the angle $\theta 2$ between the second connection part 313 and the first conductive body 312 is in the range between 60 degrees and 120 degrees. In this embodiment, the angle $\theta 2$ between the second connection part 313 and the first conductive body 312 is 90 degrees. In an embodiment, the first connection part 311 and the second connection part 313 are exposed to any two of the first surface 301, the second surface 302, the third surface 303 and the fourth surface 304 of the magnetic device 3.

The second conductive structure 32 is formed by using a pre-forming process. The second conductive structure 32 is used as a second winding of the magnetic device 3 in order to transfer power signals. The second conductive structure 32 is separated from the first conductive structure 31. In addition, the second conductive structure 32 is closer to the fourth surface 304 of the magnetic device 3 than the first conductive structure 31. The second conductive structure 32 includes a third connection part 321, a second conductive body 322 and a fourth connection part 323. The third connection part 321 is the input terminal of the second conductive structure 32. The third connection part 321 is located beside the first surface 301 and the fifth surface 305 of the magnetic device 3. In addition, a portion of the third connection part 321 is exposed to the first surface 301 and the fifth surface 305 of the magnetic device 3. The third connection part 321 is extended in the direction from the fifth surface 305 of the magnetic device 3 to the sixth surface 306 of the magnetic device 3. The second conductive body 322 is connected between the third connection part 321 and the fourth connection part 323. A first end of the second conductive body 322 is connected with the third connection part 321. The second conductive body 322 is extended in the direction from the first surface 301 of the magnetic device 3 to the third surface 303 of the magnetic device 3. As shown in FIG. 3B, the angle $\theta 3$ between the second conductive body 322 and the third connection part 321 is in the range between 60 degrees to 120 degrees. For example, the angle $\theta 3$ between the second conductive body 322 and the third connection part 321 is 90 degrees. Consequently, the second conductive body 322 is in parallel with the fifth surface 305 and the sixth surface 306 of the magnetic device 3. The fourth connection part 323 is the output terminal of the second conductive structure 32. In this embodiment, the fourth connection part 323 is located beside the third surface 303 and the sixth surface 306 of the magnetic device 3. In addition, a portion of the fourth connection part 323 is exposed to the third surface 303 and the sixth surface 306 of the magnetic device 3. The fourth connection part 323 is connected with a second end of the second conductive body 322. The fourth connection part 323 is extended in the direction from the fifth surface 305 of the magnetic device 3 to the sixth surface 306 of the magnetic device 3. As shown in FIG. 3B, the angle $\theta 4$ between the fourth connection part 323 and the second conductive body 322 is in the arrange between 60 degrees and 120 degrees. For example, the angle $\theta 4$ between fourth connection part 323 and the second conductive body 322 is 90 degrees. In an embodiment, the third connection part 321 and the fourth connection part 323 are exposed to any two of the first surface 301, the second surface 302, the third surface 303 and the fourth surface 304 of the magnetic device 3.

It is noted that the number of the conductive structures is not restricted to two. That is, the number of the conductive structures may be varied according to the number of windings of the magnetic device 3. In an embodiment, the portions of the first conductive structure 31 and the second conductive structure 32 exposed to the fifth surface 305 and the sixth surface 306 of the magnetic device 3 are electroplated and formed as contact pads. In some embodiments, the portions of the first conductive structure 31 and the second conductive structure 32 exposed to the fifth surface 305 and the sixth surface 306 of the magnetic device 3 and the peripheral regions of these exposed portions are electroplated and formed as large-area contact pads. In some embodiments, the peripheral regions of the portions of the first conductive structure 31 and the second conductive structure 32 exposed to the fifth surface 305 and the sixth surface 306 of the magnetic device 3 are electroplated and formed as large-area contact pads. Similarly, the portions of the first conductive structure 31 and the second conductive structure 32 exposed to the first surface 301 and the third surface 303 of the magnetic device 3 can be electroplated and formed as contact pads. After the associated parts are electroplated, the protective effect of anti-oxidation can be achieved.

A magnetic core of the magnetic device 3 is formed of the powder magnetic material 33. The first conductive structure 31, the second conductive structure 32 and the powder magnetic material 33 are laminated together to form the magnetic device 3. Consequently, the first conductive structure 31 and the second conductive structure 32 are embedded in the powder core material 33 (i.e., the magnetic core). The magnetic device 3 has a first surface 301, a second surface 302, a third surface 303, a fourth surface 304, a fifth surface 305 and a sixth surface 306. In some embodiments, the powder magnetic material 33 is made of metallic particles. For example, the metallic particles are iron-nickel-molybdenum alloy, iron-silicon aluminum alloy powder core, iron-nickel alloy, iron powder core, permalloy powder core, molybdenum permalloy powder core or amorphous/nanocrystalline powder core. As mentioned above, the first conductive structure 31 and the second conductive structure 32 are used as the windings, and the powder magnetic material 33 is used as the magnetic core. Consequently, it is not necessary to use an additional printed circuit board to install the windings and the magnetic core. In other words, the size tolerance of the printed circuit board is avoided, and the assembling tolerance between the printed circuit board and the magnetic core is eliminated. Consequently, the volume of the magnetic device 3 is reduced, and the performance of the magnetic device 3 is enhanced. For example, the inductance and the saturation current are increased, and the core loss and the winding loss are reduced.

In some embodiments, the powder magnetic material 33 is made of a plurality of powder core particles. Each powder core particle is coated with an insulation material (not shown). Consequently, the powder magnetic material 33 can be isolated from the first conductive structure 31 and the second conductive structure 32. For example, the insulation material is an organic coating agent (e.g., epoxy resin, polyamide resin, silicone resin, polyvinyl alcohol, phenolic resin or polystyrene, etc.) or an inorganic coating agent (e.g., mica, water glass or oxide layer).

As mentioned above, the first conductive body 312 of the first conductive structure 31 and the second conductive body 322 of the second conductive structure 32 are substantially in parallel with the fifth surface 305 and the sixth surface 306 of the magnetic device 3. Due to this design, the thickness of the powder magnetic material 33 along the magnetic force line is relatively small. Consequently, the distribution of the magnetic force line is more uniform, the core loss of the powder magnetic material 33 is low, and the saturation current capability of the magnetic core is high. As mentioned above, the two connection parts of each of the first conductive structure 31 and the second conductive structure 32 are exposed to the two opposite surfaces of the magnetic device 3 (i.e., the first surface 301 and the third surface 303 of the magnetic device 3), and the first conductive body 312 of the first conductive structure 31 and the second conductive body 322 of the second conductive structure 32 are substantially perpendicular to the first surface 301 and the third surface 303 of the magnetic device 3. Since the magnetic force line passes through a long length and a large cross-sectional area (i.e., along the conductive bodies), the core loss of the powder magnetic material 33 is lower and the saturation current capability of the magnetic core is high.

The first electroplating structure 34 includes a plurality of first sub-electroplating conductive parts 34a, which are used as a differential signal structure of the magnetic device 3. In the embodiment of FIG. 3B, the first electroplating structure 34 includes eight first sub-electroplating conductive parts 34a. These first sub-electroplating conductive parts 34a are in parallel with each other. Moreover, four of the eight first sub-electroplating conductive parts 34a are located beside a first side of the third conductive structure 36, and the other four of the eight first sub-electroplating conductive parts 34a are located beside a second side of the third conductive structure 36. Especially, every two adjacent first sub-electroplating conductive parts 34a are formed as a differential signal pair. In other words, the eight first sub-electroplating conductive parts 34a are divided into four differential signal pairs.

The second electroplating structure 35 includes a plurality of second sub-electroplating conductive parts 35a, which are used as a differential signal structure of the magnetic device 3. In the embodiment of FIG. 3B, the second electroplating structure 35 includes eight second sub-electroplating conductive parts 35a. These second sub-electroplating conductive parts 35a are in parallel with each other. Moreover, four of the eight second sub-electroplating conductive parts 35a are located beside a first side of the fourth conductive structure 37, and the other four of the eight second sub-electroplating conductive parts 35a are located beside a second side of the fourth conductive structure 37. Especially, every two adjacent second sub-electroplating conductive parts 35a are formed as a differential signal pair. In other words, the eight second sub-electroplating conductive parts 35a are divided into four differential signal pairs.

As mentioned above, the first sub-electroplating conductive parts 34a and the second sub-electroplating conductive parts 35a are divided into a plurality of differential signal pairs. Due to the differential signal pairs, the stray magnetic fluxes generated by the surface and the periphery of the magnetic device 3 are prevented from passing through the loops of the conductive structures. Consequently, the coupled voltage is not generated, and the interference on the control signal is avoided.

The first electroplating structure 34 is used to transfer control signals and power signals. The first electroplating structure 34 is electroplated on the fifth surface 305, the second surface 302 and the sixth surface 306 of the magnetic device 3. The first electroplating structure 34 is connected with the second surface 22 of the first circuit board 2 and the first surface 51 of the second circuit board 5. The control signals and the power signals from the system board are transferred to the first circuit board 2 through the conductive traces of the second circuit board 5 and the first electroplating structure 34, and then transferred to the switch components 4 on the first surface 21 of the first circuit board 2 through the conductive traces of the first circuit board 2. Consequently, the control signals and the power signals can be transferred between the first circuit board 2 and the second circuit board 5. For example, the control signals are PWM signals or current sensing signals, and the power signals are signals from the positive input terminal or the ground terminal. In an embodiment, a portion of the first electroplating structure 34 includes pre-formed structures, and another portion of the first electroplating structure 34 includes copper bars. In addition, the pre-formed structure and the copper bars of the first electroplating structure 34 are laminated on the fifth surface 305, the second surface 302 and the sixth surface 306 of the magnetic device 3. In another embodiment, the first electroplating structure 34 is an electroplated structure that is electroplated with metallic material (e.g., copper). The first electroplating structure 34 are electroplated on the fifth surface 305, the second surface 302 and the sixth surface 306 of the magnetic device 3. Further, the thickness of the first electroplating structure 34 is greater than 15 μm, e.g., 35 μm or 50 μm. Consequently, the capability of the first electroplating structure 34 to transfer current is increased, and the power loss is reduced. Moreover, since the volume of the first electroplating structure 34 is small and the distribution density of the first electroplating structure 34 is high, the signal transfer density is enhanced.

The second electroplating structure 35 is used to transfer control signals and power signals. The second electroplating structure 35 is electroplated on the fifth surface 305, the fourth surface 304 and the sixth surface 306 of the magnetic device 3. The second electroplating structure 35 is connected with the second surface 22 of the first circuit board 2 and the first surface 51 of the second circuit board 5. The control signals and the power signals from the system board are transferred to the first circuit board 2 through the conductive traces of the second circuit board 5 and the second electroplating structure 35, and then transferred to the switch components 4 on the first surface 21 of the first circuit board 2 through the conductive traces of the first circuit board 2. Consequently, the control signals and the power signals can be transferred between the first circuit board 2 and the second circuit board 5. For example, the control signals are PWM signals or current sensing signals, and the power signals are signals from the positive input terminal or the ground terminal. In an embodiment, a portion of the second electroplating structure 35 includes pre-formed structures, and another portion of the second electroplating structure 35 includes copper bars. In addition, the pre-formed structure and the copper bars of the second electroplating structure 35 are laminated on the fifth surface 305, the fourth surface 304 and the sixth surface 306 of the magnetic device 3. In another embodiment, the second electroplating structure 35 is an electroplated structure that is electroplated with metallic material (e.g., copper). The second electroplating structure 35 are electroplated on the fifth surface 305, the fourth surface 304 and the sixth surface 306 of the magnetic device 3. Further, the thickness of the second electroplating structure 35 is greater than 15 μm, e.g., 35 μm or 50 μm. Consequently, the capability of the second electroplating structure 35 to transfer current is increased, and the power loss is reduced. Moreover, since the volume of the second electroplating structure 35 is small and the distribution density of the second electroplating structure 35 is high, the signal transfer density is enhanced.

In an embodiment, the portion of the first electroplating structure 34 on the second surface 302 and the portion of the second electroplating structure 35 on the fourth surface 304 are coated with protective materials to achieve the effects of corrosion prevention and solder resist. In an embodiment, the first electroplating structure 34 and the second electroplating structure 35 are thinner than the first conductive structure 31 or the second conductive structure 32. In an embodiment, contact pads are formed on the fifth surface 305 and the sixth surface 306 of the magnetic device 3, and portions of the first electroplating structure 34 and the second electroplating structure 35 are connected with the contact pads (see also FIG. 8B).

The third conductive structure 36 is disposed on the second surface 302 of the magnetic device 3. A portion of the third conductive structure 36 is exposed to the fifth surface 305 and the sixth surface 306 of the magnetic device 3. The third conductive structure 36 is connected between the second surface 22 of the first circuit board 2 and the first surface 51 of the second circuit board 5. In addition, the third conductive structure 36 is contacted to the ground terminal.

The fourth conductive structure 37 is disposed on the fourth surface 304 of the magnetic device 3. A portion of the fourth conductive structure 37 is exposed to the fifth surface 305 and the sixth surface 306 of the magnetic device 3. The fourth conductive structure 37 is connected between the second surface 22 of the first circuit board 2 and the first surface 51 of the second circuit board 5. In addition, the fourth conductive structure 37 is connected to the ground terminal.

In an embodiment, the portions of the third conductive structure 36 and the fourth conductive structure 37 exposed to the fifth surface 305 and the sixth surface 306 of the magnetic device 3 are electroplated and formed as contact pads. Consequently, the impedance between the fifth surface 305 and the sixth surface 306 of the magnetic device 3 is reduced, and the capability of withstanding the large current is increased. Due to the portions of the third conductive structure 36 and the fourth conductive structure 37 exposed to the second surface 302 and the fourth surface 304, the connection impedance between the first circuit board 2 and the second circuit board 5 is reduced, and the third conductive structure 36 and the fourth conductive structure 37 are connected to the ground terminal through the second circuit board 5. In some embodiments, the portions of the third conductive structure 36 and the fourth conductive structure 37 exposed to the fifth surface 305 and the sixth surface 306 of the magnetic device 3 and the peripheral regions of these exposed portions are electroplated and formed as large-area contact pads. In some embodiments, the peripheral regions of the portions of the third conductive structure 36 and the fourth conductive structure 37 exposed to the fifth surface 305 and the sixth surface 306 of the magnetic device 3 are electroplated and formed as large-area contact pads. In some embodiments, the surfaces of the third conductive structure 36 and the fourth conductive structure 37 that are not exposed to the fifth surface 305 and the sixth surface 306 of the magnetic device 3 are electroplated and formed as large-area contact pads. Similarly, the portions of the third conductive structure 36 and the fourth conductive structure 37 exposed to the second surface 302 and the fourth surface 304 of the magnetic device 3 can be electroplated. After the associated parts are electroplated, the protective effect of anti-oxidation can be achieved.

Please refer to FIGS. 1A, 1B, 1C, 1D and 2. The flow path of the power signal of the power conversion module 1 will be described as follows. Firstly, the second circuit board 5 receives an input power signal from the system board. Then, the input power signal is transferred to the switch component 4 through the first electroplating structure 34 and the second electroplating structure 35. Then, the input power signal is converted into a PWM signal by the switch component 4, and the PWM signal is transferred to the magnetic device 3. Then, the PWM signal is converted into an output power signal by the first conductive structure 31 and the second conductive structure 32 of the magnetic device 3. The DC voltage amplitude of the output power signal is smaller than the DC voltage amplitude of the input power signal. After the output power signal is transferred from the magnetic device 3 to the second circuit board 5, the output power signal is transferred to the system board. The ground terminal GND of the power conversion module 1 is connected to the second circuit board 5 through the system board, and then connected to the switch component 4 through the third conductive structure 36 and the fourth conductive structure 37. Consequently, the ground mesh of the power conversion module 1 is established.

The structure of the magnetic device of the present disclosure has many examples. Further, the first connection part 311 and the third connection part 321 are exposed to the fifth surface 305 of the magnetic device 3, and the second connection part 313 and the fourth connection part 323 are exposed to the sixth surface 306 of the magnetic device 3. Moreover, the first connection part 311 and the second connection part 313 are respectively exposed to any two of the first surface 301, the second surface 302, the third surface 303 and the fourth surface 304 of the magnetic device 3, and the third connection part 321 and the fourth connection part 323 are respectively exposed to any two of the first surface 301, the second surface 302, the third surface 303 and the fourth surface 304.

Please refer to FIGS. 3A, 3B and 3C. FIG. 3C is a flowchart illustrating a process of manufacturing the magnetic device as shown in FIG. 3A.

Firstly, in a step S1, a first conductive structure 31 and a second conductive structure 32 are provided. The first conductive structure 31 includes a first connection part 311, a first conductive body 312 and a second connection part 313. The first conductive body 312 is connected between the first connection part 311 and the second connection part 313. The second conductive structure 32 includes a third connection part 321, a second conductive body 322 and a fourth connection part 323. The second conductive body 322 is connected between the third connection part 321 and the fourth connection part 323. In some embodiments, the first conductive structure 31 and the second conductive structure 32 are formed by using a pre-forming process.

Then, in a step S2, a powder magnetic material 33 is provided. The powder magnetic material 33, the first conductive structure 31 and the second conductive structure 32 are laminated together to form a first surface 301, a second surface 302, a third surface 303, a fourth surface 304, a fifth surface 305 and a sixth surface 306 of the magnetic device 3. The first conductive structure 31 and the second conductive structure 32 are embedded in the powder magnetic material 33. The first surface 301 and the third surface 303 are opposed to each other. The second surface 302 and the fourth surface 304 are opposed to each other. The fifth surface 305 and the sixth surface 306 are opposed to each other. In some embodiments, the powder magnetic material 33 includes a plurality of powder core particles. After the powder core particles are coated with an insulation material (not shown), the powder magnetic material 33, the first conductive structure 31 and the second conductive structure 32 are laminated together.

Then, in a step S3, the powder magnetic material 33 is milled. Consequently, the first connection part 311 and the third connection part 321 are exposed to the fifth surface 305 of the magnetic device 3, and the second connection part 313 and the fourth connection part 323 are exposed to the sixth surface 306 of the magnetic device 3. In addition, the first connection part 311 and the second connection part 313 are respectively exposed to any two of the first surface 301, the second surface 302, the third surface 303 and the fourth surface 304 of the magnetic device 3, and the third connection part 321 and the fourth connection part 323 are respectively exposed to any two of the first surface 301, the second surface 302, the third surface 303 and the fourth surface 304 of the magnetic device 3.

Then, in a step S4, a first electroplating structure 34 is formed on the fifth surface 305, the second surface 302 and the sixth surface 306 of the magnetic device 3, and a second electroplating structure 35 is formed on the fifth surface 305, the fourth surface 304 and the sixth surface 306 of the magnetic device 3.

FIG. 3D is a flowchart illustrating another process of manufacturing the magnetic device as shown in FIG. 3A. In this embodiment, after the step S4, a step S5 is performed. In the step S5, the portion of the first electroplating structure 34 on the second surface 302 and the portion of the second electroplating structure 35 on the fourth surface 304 are coated with protective materials to achieve the effects of corrosion prevention and solder resist. Optionally, the magnetic device 3 is subjected to an annealing process. Consequently, the core loss of the magnetic device 3 is reduced, and the performance stability of the magnetic device 3 is enhanced.

Figure 4A:
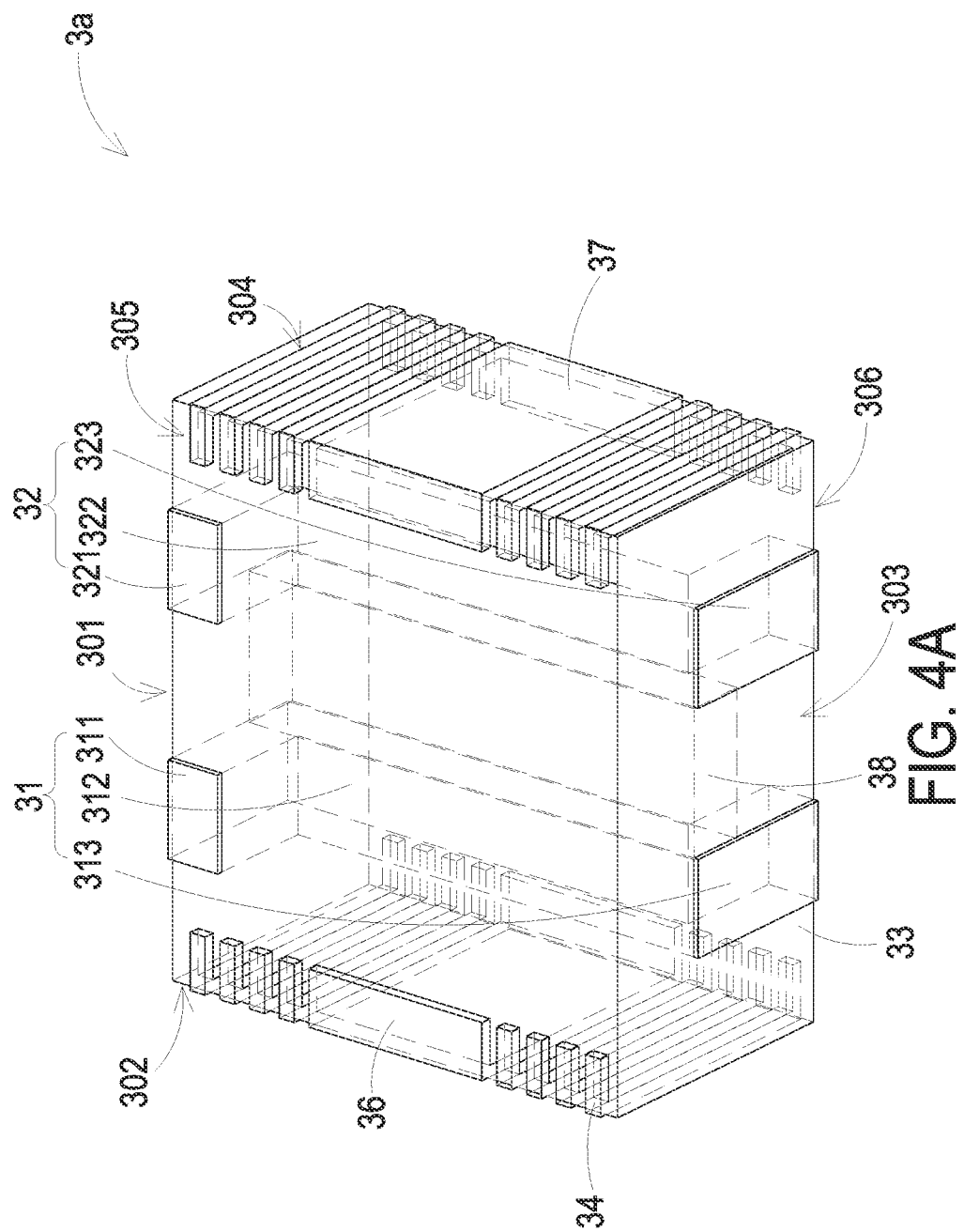
FIG. 4A is a schematic perspective view illustrating a second exemplary structure of the magnetic device of the power conversion module as shown in FIG. 1A.
Figure 4B:
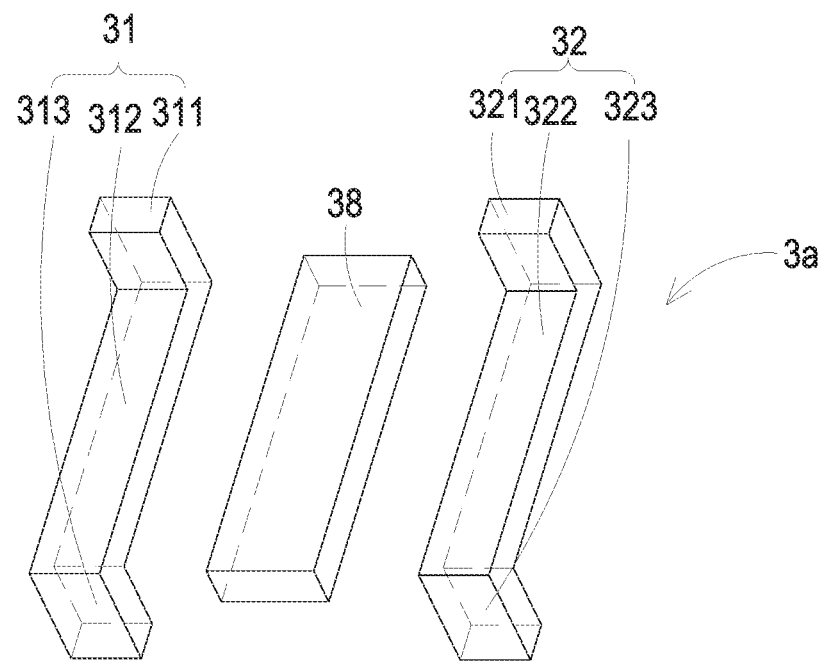
FIG. 4B is a schematic exploded view illustrating the magnetic device as shown in FIG. 4A.
Figure 4B:
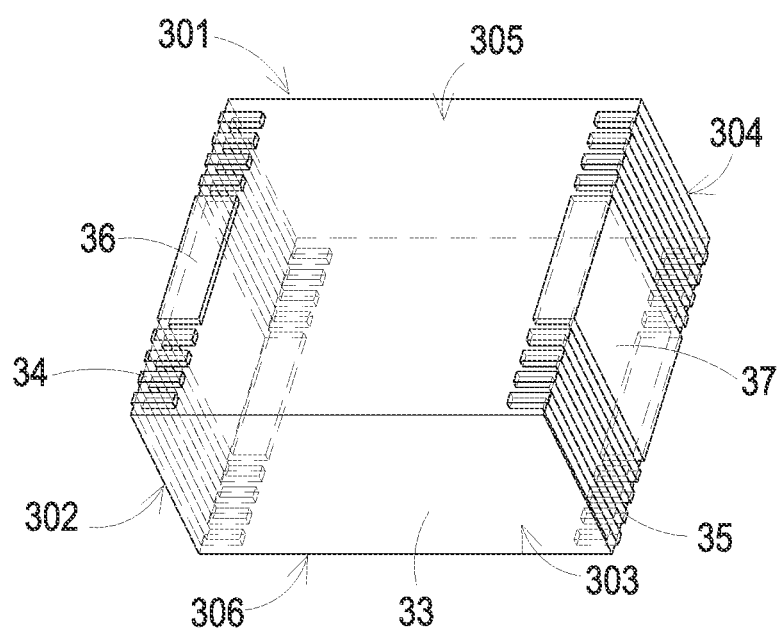

Please refer to FIGS. 4A and 4B. FIG. 4A is a schematic perspective view illustrating a second exemplary structure of the magnetic device of the power conversion module as shown in FIG. 1A. FIG. 4B is a schematic exploded view illustrating the magnetic device as shown in FIG. 4A. In comparison with the magnetic device 3 as shown in FIGS. 3A and 3B, the magnetic device 3a of this embodiment further includes a ferrite structure 38. The ferrite structure 38 is embedded in the powder magnetic material 33. The ferrite structure 38 is arranged between the first conductive structure 31 and the second conductive structure 32. Moreover, the ferrite structure 38 is in parallel with the first conductive body 312 of the first conductive structure 31 and the second conductive body 322 of the second conductive structure 32. The DC magnetic fluxes generated by the first conductive structure 31 and the second conductive structure 32 are cancelled out on the ferrite structure 38. The AC magnetic fluxes generated by the first conductive structure 31 and the second conductive structure 32 are superposed on the ferrite structure 38. Due to the arrangement of the ferrite structure 38, the core loss of the powder magnetic material 33 is largely reduced, and the volume of the magnetic core is reduced. The magnetic device 3a of this embodiment can be applied to the power conversion module in any embodiment of the present disclosure. Moreover, the shape and the size of the ferrite structure 38 may be varied according to the practical requirements.

Figure 5A:
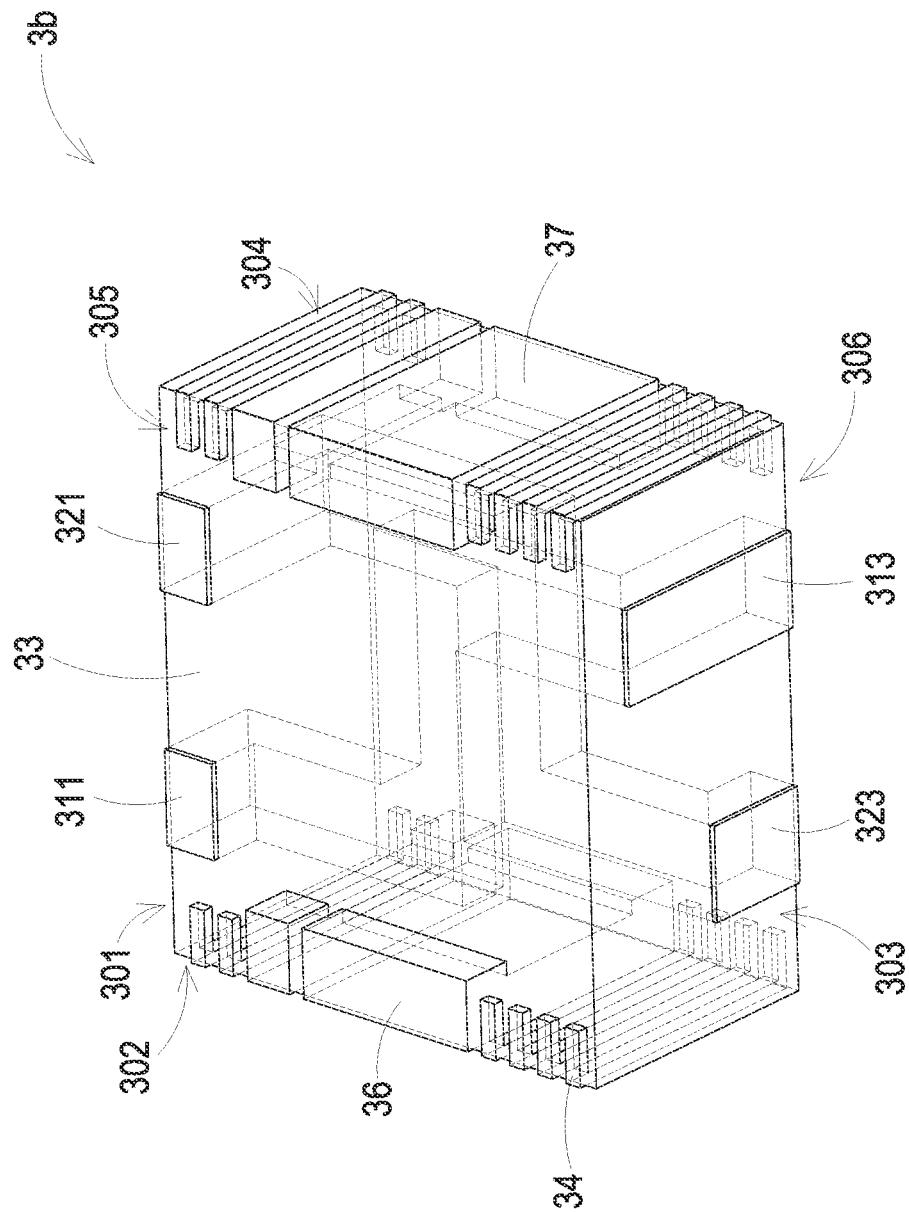
FIG. 5A is a schematic perspective view illustrating a third exemplary structure of the magnetic device of the power conversion module as shown in FIG. 1A.
Figure 5B:
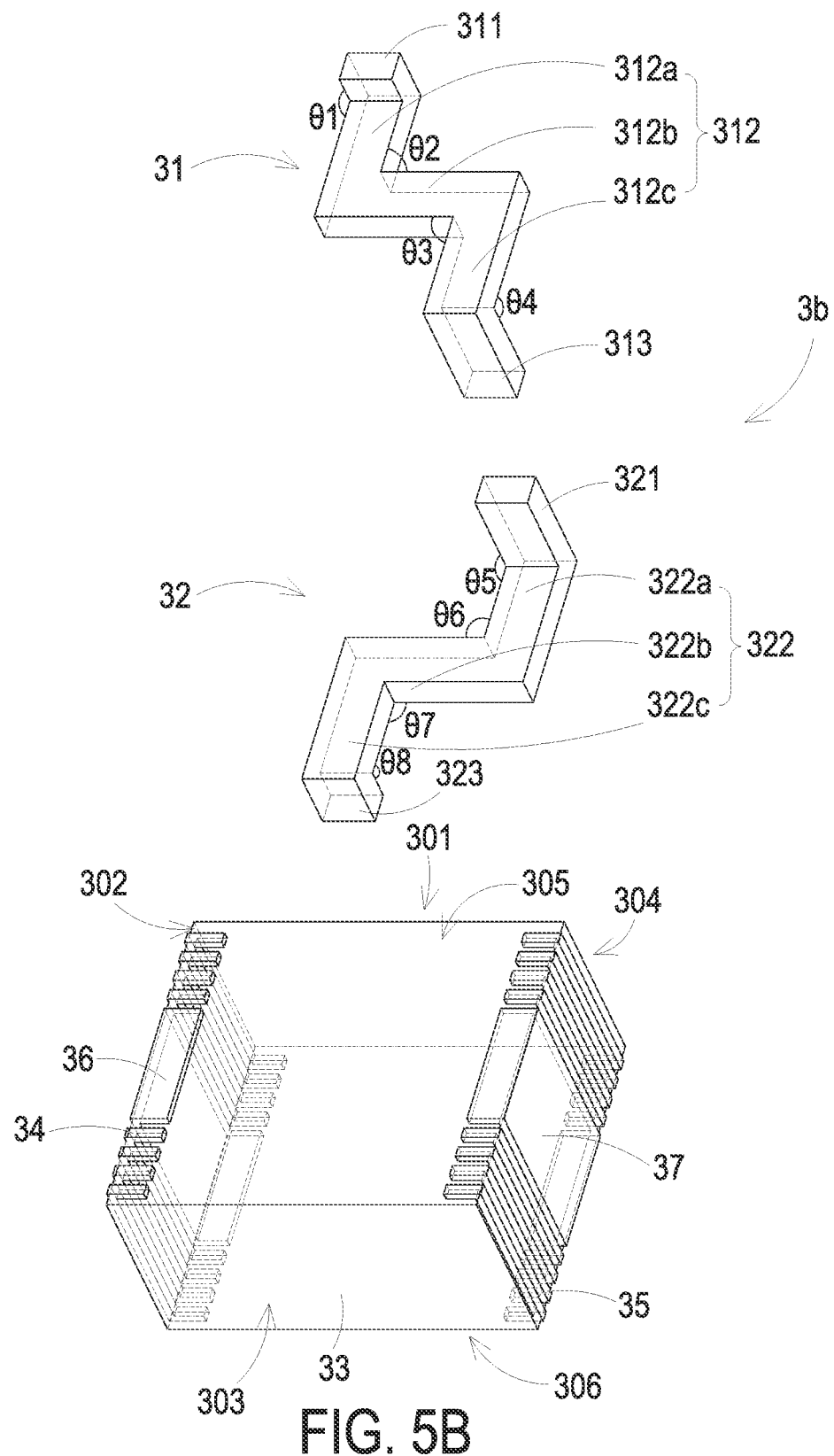
FIG. 5B is a schematic exploded view illustrating the magnetic device as shown in FIG. 5A.

Please refer to FIGS. 5A and 5B. FIG. 5A is a schematic perspective view illustrating a third exemplary structure of the magnetic device of the power conversion module as shown in FIG. 1A. FIG. 5B is a schematic exploded view illustrating the magnetic device as shown in FIG. 5A. In comparison with the magnetic device 3 as shown in FIGS. 3A and 3B, the first conductive body 312 of the first conductive structure 31 of the magnetic device 3b in this embodiment includes a first extension part 312a, a second extension part 312b and a third extension part 312c. A first end of the first extension part 312a is connected with the first connection part 311. The first extension part 312a is extended in the direction from the first surface 301 of the magnetic device 3b to the third surface 303 of the magnetic device 3b. The angle θ1 between the first extension part 312a and the first connection part 311 is in the range between 60 degrees and 120 degrees as shown in FIG. 5B. In this embodiment, the angle θ1 between the first extension part 312a and the first connection part 311 is 90 degrees. A first end of the second extension part 312b is connected with a second end of the first extension part 312a. The second extension part 312b is extended in the direction from the second surface 302 of the magnetic device 3b to the fourth surface 304 of the magnetic device 3b. The angle θ2 between the second extension part 312b and the first extension part 312a is in the range between 60 degrees and 120 degrees as shown in FIG. 5B. In an embodiment, the angle θ2 between the second extension part 312b and the first extension part 312a is 90 degrees. A first end of the third extension part 312c is connected with a second end of the second extension part 312b. The third extension part 312c is extended in the direction from the first surface 301 of the magnetic device 3b to the third surface 303 of the magnetic device 3b. The angle θ3 between the third extension part 312c and the second extension part 312b is in the range between 60 degrees and 120 degrees as shown in FIG. 5B. In an embodiment, the angle θ3 between the third extension part 312c and the second extension part 312b is 90 degrees. The second connection part 313 is connected with a second end of the third extension part 312c. The second connection part 313 is extended in the direction from the fifth surface 305 of the magnetic device 3b to the sixth surface 306 of the magnetic device 3b. The angle θ4 between the second connection part 313 and the third extension part 312c is in the range between 60 degrees and 120 degrees as shown in FIG. 5B. In an embodiment, the angle θ4 between the second connection part 313 and the third extension part 312c is 90 degrees.

In comparison with the magnetic device 3 as shown in FIGS. 3A and 3B, the second conductive body 322 of the second conductive structure 32 of the magnetic device 3b in this embodiment further includes a fourth extension part 322a, a fifth extension part 322b and a sixth extension part 322c. A first end of the fourth extension part 322a is connected with the third connection part 321. The fourth extension part 322a is extended in the direction from the first surface 301 of the magnetic device 3b to the third surface 303 of the magnetic device 3b. The angle θ5 between the fourth extension part 322a and the third connection part 321 is in the range between 60 degrees and 120 degrees as shown in FIG. 5B. In an embodiment, the angle θ5 between the fourth extension part 322a and the third connection part 321 is 90 degrees. A first end of the fifth extension part 322b is connected with a second end of the fourth extension part 322a. The fifth extension part 322b is extended in the direction from the fourth surface 304 of the magnetic device 3b to the second surface 302 of the magnetic device 3b. The angle θ6 between the fifth extension part 322b and the fourth extension part 322a is in the range between 60 degrees and 120 degrees as shown in FIG. 5B. In an embodiment, the angle θ6 between the fifth extension part 322b and the fourth extension part 322a is 90 degrees. A first end of the sixth extension part 322c is connected with a second end of the fifth extension part 322b. The sixth extension part 322c is extended in the direction from the first surface 301 of the magnetic device 3b to the third surface 303 of the magnetic device 3b. The angle θ7 between the sixth extension part 322c and the fifth extension part 322b is in the range between 60 degrees and 120 degrees as shown in FIG. 5B. In an embodiment, the angle θ7 between the sixth extension part 322c and the fifth extension part 322b is 90 degrees. The fourth connection part 323 is connected with a second end of the sixth extension part 322c. The fourth connection part 323 is extended in the direction from the fifth surface 305 of the magnetic device 3b to the sixth surface 306 of the magnetic device 3b. The angle θ8 between the fourth connection part 323 and the sixth extension part 322c is in the range between 60 degrees and 120 degrees as shown in FIG. 5B. In an embodiment, the angle θ8 between the fourth connection part 323 and the sixth extension part 322c is 90 degrees.

In this embodiment, the first connection part 311 is shorter than the third connection part 321, and the second connection part 313 is longer than the fourth connection part 323. The first connection part 311 is closer to the second surface 302 of the magnetic device 3b than the third connection part 321. The fourth connection part 323 is closer to the second surface 302 of the magnetic device 3b than the second connection part 313.

As shown in FIGS. 5A and 5B, the first conductive structure 31 and the second conductive structure 32 are partially overlapped with each other. The region of the first conductive structure 31 and the region of the second conductive structure 32 that are overlapped in the vertical direction are separated from each other by a gap. Further, an insulation material is filled in the gap to avoid the direct contact between the first conductive structure 31 and the second conductive structure 32. Since each of the first conductive structure 31 and the second conductive structure 32 has many bent regions, the frequency of the AC magnetic flux generated by the powder magnetic material 33 of the magnetic device 3b is increased, and the amplitude is reduced. Consequently, the equivalent output inductance of the power conversion module 1 is largely increased, and the output ripple is largely reduced.

Figure 6A:
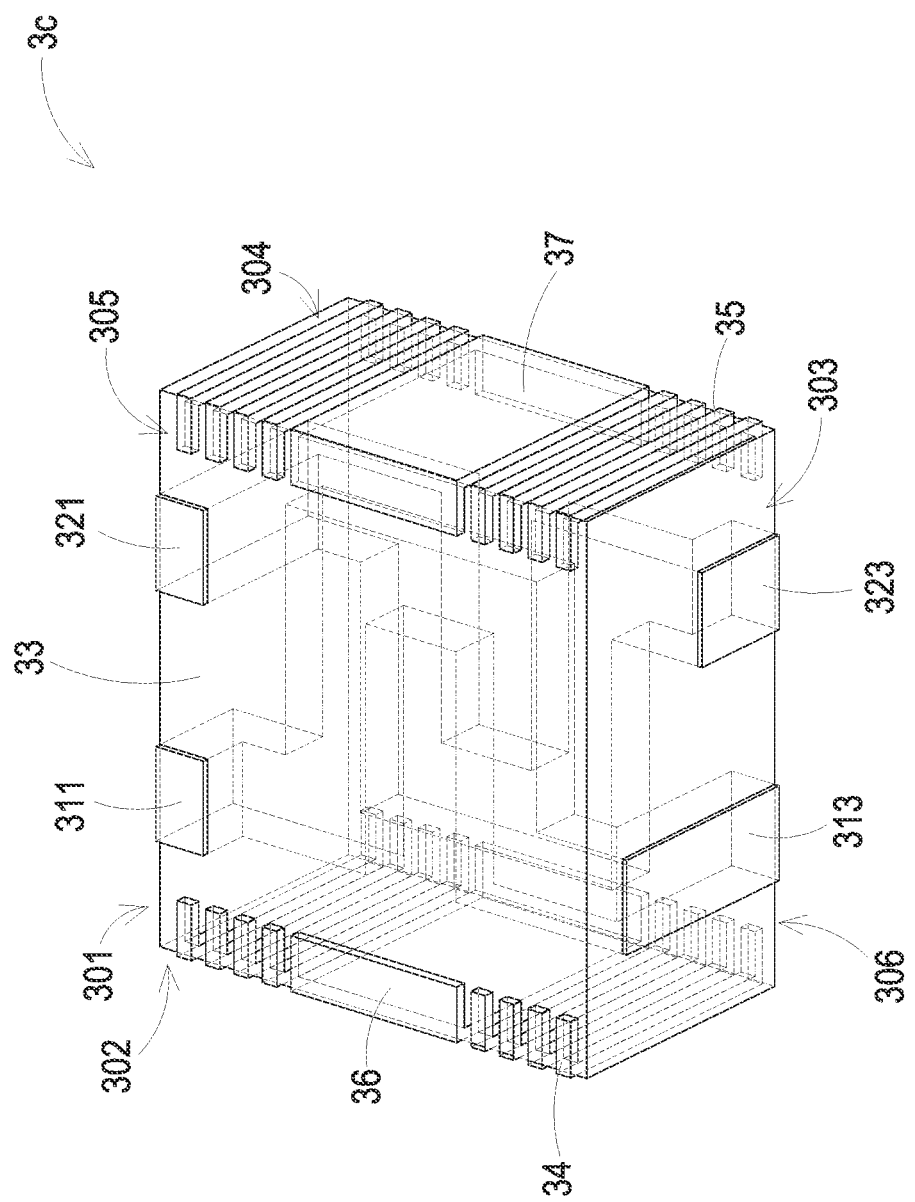
FIG. 6A is a schematic perspective view illustrating a fourth exemplary structure of the magnetic device of the power conversion module as shown in FIG. 1A.
Figure 6B:
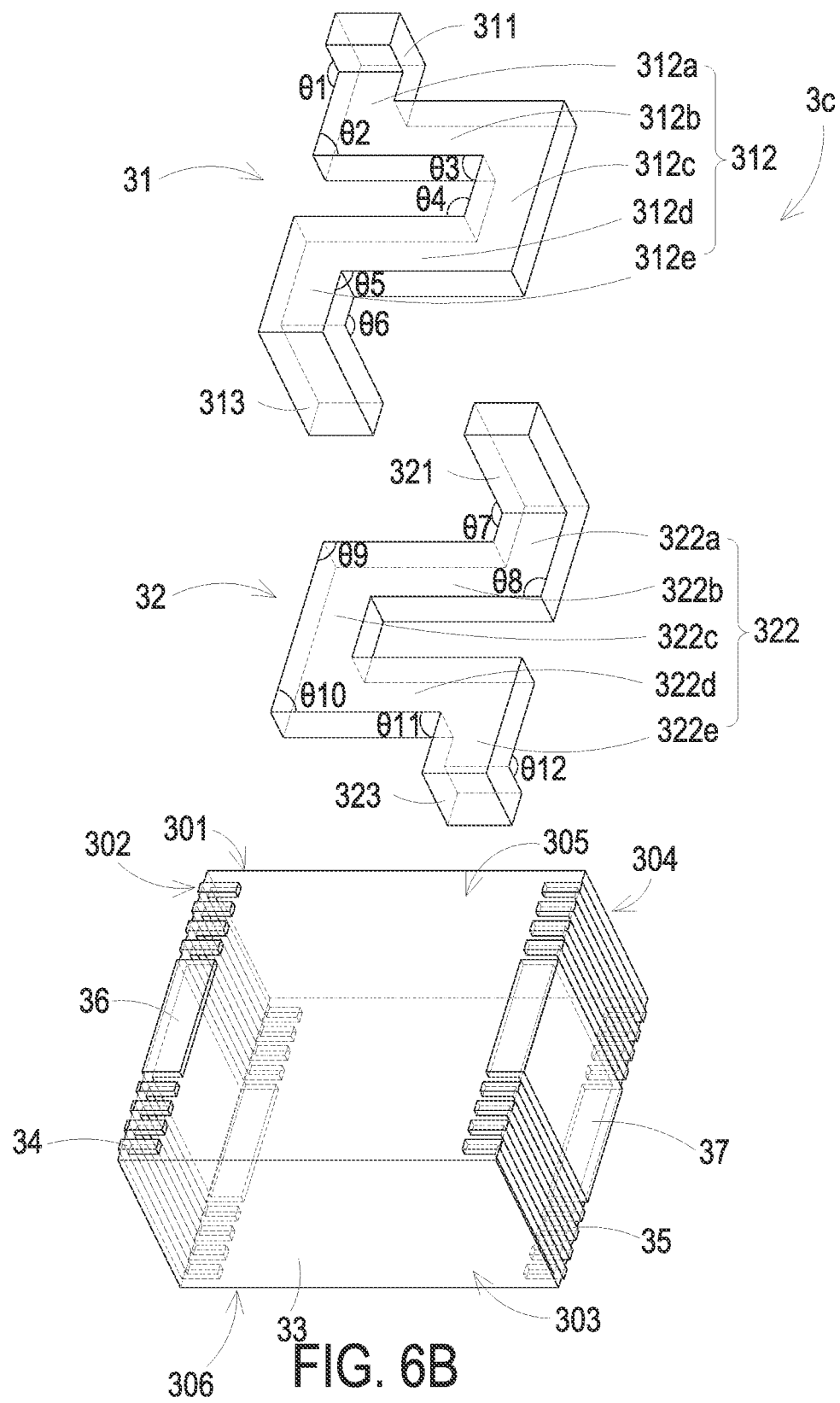
FIG. 6B is a schematic exploded view illustrating the magnetic device as shown in FIG. 6A.

Please refer to FIGS. 6A and 6B. FIG. 6A is a schematic perspective view illustrating a fourth exemplary structure of the magnetic device of the power conversion module as shown in FIG. 1A. FIG. 6B is a schematic exploded view illustrating the magnetic device as shown in FIG. 6A. In comparison with the magnetic device 3 as shown in FIGS. 3A and 3B, the first conductive body 312 of the first conductive structure 31 of the magnetic device 3c in this embodiment includes a first extension part 312a, a second extension part 312b, a third extension part 312c, a fourth extension part 312d and a fifth extension part 312e. A first end of the first extension part 312a is connected with the first connection part 311. The first extension part 312a is extended in the direction from the first surface 301 of the magnetic device 3c to the third surface 303 of the magnetic device 3c. The angle θ1 between the first extension part 312a and the first connection part 311 is in the range between 60 degrees and 120 degrees as shown in FIG. 6B. In the embodiment, the angle θ1 between the first extension part 312a and the first connection part 311 is 90 degrees. A first end of the second extension part 312b is connected with a second end of the first extension part 312a. The second extension part 312b is extended in the direction from the second surface 302 of the magnetic device 3c to the fourth surface 304 of the magnetic device 3c. The angle θ2 between the second extension part 312b and the first extension part 312a is in the range between 60 degrees and 120 degrees as shown in FIG. 6B. In the embodiment, the angle θ2 between the second extension part 312b and the first extension part 312a is 90 degrees. A first end of the third extension part 312c is connected with a second end of the second extension part 312b. The third extension part 312c is extended in the direction from the first surface 301 of the magnetic device 3b to the third surface 303 of the magnetic device 3c. The angle θ3 between the third extension part 312c and the second extension part 312b is in the range between 60 degrees and 120 degrees as shown in FIG. 6B. In the embodiment, the angle θ3 between the third extension part 312c and the second extension part 312b is 90 degrees. A first end of the fourth connection part 312d is connected with a second end of the third extension part 312c. The fourth connection part 312d is extended in the direction from the fourth surface 304 of the magnetic device 3c to the second surface 302 of the magnetic device 3c. The angle θ4 between the fourth extension part 312d and the third extension part 312c is in the range between 60 degrees and 120 degrees as shown in 6B. In the embodiment, the angle θ4 between the fourth extension part 312d and the third extension part 312c is 90 degrees. A first end of the fifth connection part 312 is connected with a second end of the fourth extension part 312d. The fifth connection part 312 is extended in the direction from first surface 301 of the magnetic device 3c to the third surface 303 of the magnetic device 3c. The angle θ5 between the fifth extension part 312e and the fourth extension part 312d is in the range between 60 degrees and 120 degrees as shown in FIG. 6B. In the embodiment, the angle θ5 between the fifth extension part 312e and the fourth extension part 312d is 90 degrees. A first end of the second connection part 313 is connected with a second end of the fifth extension part 312e. The second connection part 313 is extended in the direction from the fifth surface 305 of the magnetic device 3c to the sixth surface 306 of the magnetic device 3c. The angle θ6 between the second connection part 313 and the fifth extension part 312e is in the range between 60 degrees and 120 degrees as shown in FIG. 6B. In the embodiment, the angle θ6 between the second connection part 313 and the fifth extension part 312e is 90 degrees.

In comparison with the magnetic device 3 as shown in FIGS. 3A and 3B, the second conductive body 322 of the second conductive structure 32 of the magnetic device 3c in this embodiment includes a sixth extension part 322a, a seventh extension part 322b, an eighth extension part 322c, a ninth extension part 322d and a tenth extension part 322e. A first end of the sixth extension part 322a is connected with the third connection part 321. The sixth extension part 322a is extended in the direction from first surface 301 of the magnetic device 3c to the third surface 303 of the magnetic device 3c. The angle θ7 between the sixth extension part 322a and the third connection part 321 is in the range between 60 degrees and 120 degrees as shown in FIG. 6B. In the embodiment, the angle θ7 between the sixth extension part 322a and the third connection part 321 is 90 degrees. A first end of the seventh extension part 322b is connected with a second end of the sixth extension part 322a. The seventh extension part 322b is extended in the direction from the fourth surface 304 of the magnetic device 3c to the second surface 302 of the magnetic device 3c. The angle θ8 between the seventh extension part 322b and the sixth extension part 322a is in the range between 60 degrees and 120 degrees as shown in FIG. 6B. In the embodiment, the angle θ8 between the seventh extension part 322b and the sixth extension part 322a is 90 degrees. A first end of the eighth extension part 322c is connected with a second end of the seventh extension part 322b. The eighth extension part 322c is extended in the direction from the first surface 301 of the magnetic device 3c to the third surface 303 of the magnetic device 3c. The angle θ9 between the eighth extension part 322c and the seventh extension part 322b is in the range between 60 degrees and 120 degrees as shown in FIG. 6B. In the embodiment, the angle θ9 between the eighth extension part 322c and the seventh extension part 322b is 90 degrees. A first end of the ninth connection part 322d is connected with a second end of the eighth extension part 322c. The ninth connection part 322d is extended in the direction from the second surface 302 of the magnetic device 3c to the fourth surface 304 of the magnetic device 3c. The angle θ10 between the ninth extension part 322d and the eighth extension part 322c is in the range between 60 degrees and 120 degrees as shown in FIG. 6B. In the embodiment, the angle θ10 between the ninth extension part 322d and the eighth extension part 322c is 90 degrees. A first end of the tenth extension part 322e is connected with a second end of the ninth extension part 322d. The tenth extension part 322e is extended in the direction from the first surface 301 of the magnetic device 3c to the third surface 303 of the magnetic device 3c. The angle θ11 between the tenth extension part 322e and the ninth extension part 322d is in the range between 60 degrees and 120 degrees as shown in FIG. 6B. In the embodiment, the angle θ11 between the tenth extension part 322e and the ninth extension part 322d is 90 degrees. A first end of the fourth connection part 323 is connected with a second end of the tenth extension part 322e. The fourth connection part 323 is extended in the direction from the fifth surface 305 of the magnetic device 3c to the sixth surface 306 of the magnetic device 3c. The angle θ12 between the fourth connection part 323 and the tenth extension part 322e is in the range between 60 degrees and 120 degrees as shown in FIG. 6B. In the embodiment, the angle θ12 between the fourth connection part 323 and the tenth extension part 322e is 90 degrees.

In this embodiment, the first connection part 311 is shorter than the third connection part 321, and the second connection part 313 is longer than the fourth connection part 323. The first connection part 311 is closer to the second surface 302 of the magnetic device 3b than the third connection part 321. The second connection part 313 is closer to the second surface 302 of the magnetic device 3b than the fourth connection part 323.

As shown in FIGS. 6A and 6B, the first conductive structure 31 and the second conductive structure 32 are partially overlapped with each other. The region of the first conductive structure 31 and the region of the second conductive structure 32 that are overlapped in the vertical direction are separated from each other by a gap. Further, an insulation material is filled in the gap to avoid the direct contact between the first conductive structure 31 and the second conductive structure 32. Since each of the first conductive structure 31 and the second conductive structure 32 has many bent regions, the frequency of the AC magnetic flux generated by the powder magnetic material 33 of the magnetic device 3c is increased, and the amplitude is reduced. Consequently, the equivalent output inductance of the power conversion module 1 is largely increased, and the output ripple is largely reduced. Moreover, since the thickness of the magnetic core formed by the powder magnetic material 33 is reduced, the magnetic device 3c is helpful to the miniaturization of the power conversion module 1.

Figure 7:
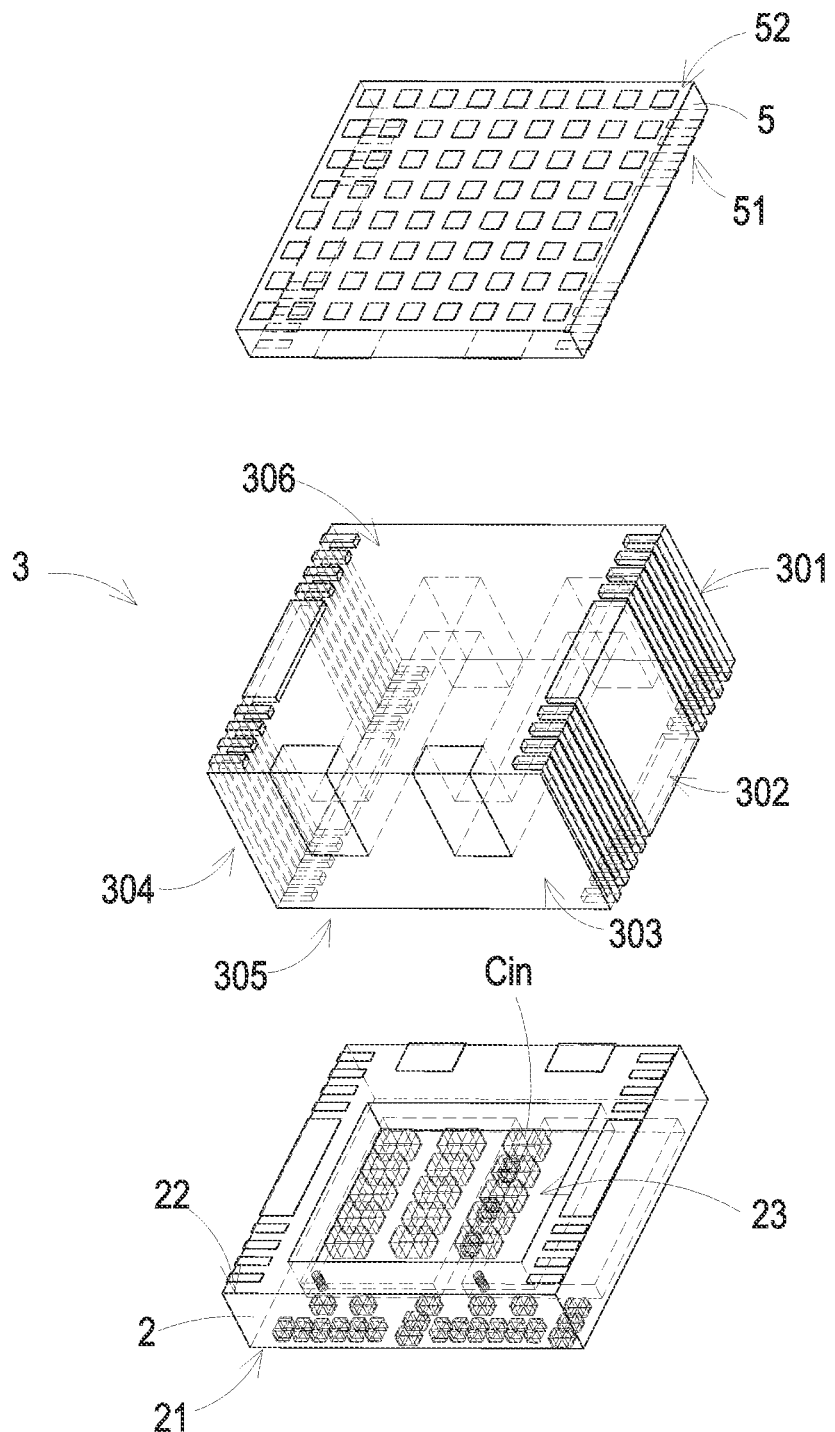
FIG. 7 is a schematic exploded view illustrating a power conversion module according to a second embodiment of the present disclosure.

FIG. 7 is a schematic exploded view illustrating a power conversion module according to a second embodiment of the present disclosure. In comparison with the power conversion module 1 of the first embodiment, the first circuit board 2 of the power conversion module 1a of this embodiment further includes a recess 23. The recess 23 is concavely formed from the second surface 22 of the first circuit board 2. The input capacitor Cin is disposed within the recess 23. Since the area of the first circuit board 2 is largely reduced, the area of the power conversion module 1a is largely reduced. Moreover, the power density of the power conversion module 1a is increased.

Figure 8A:
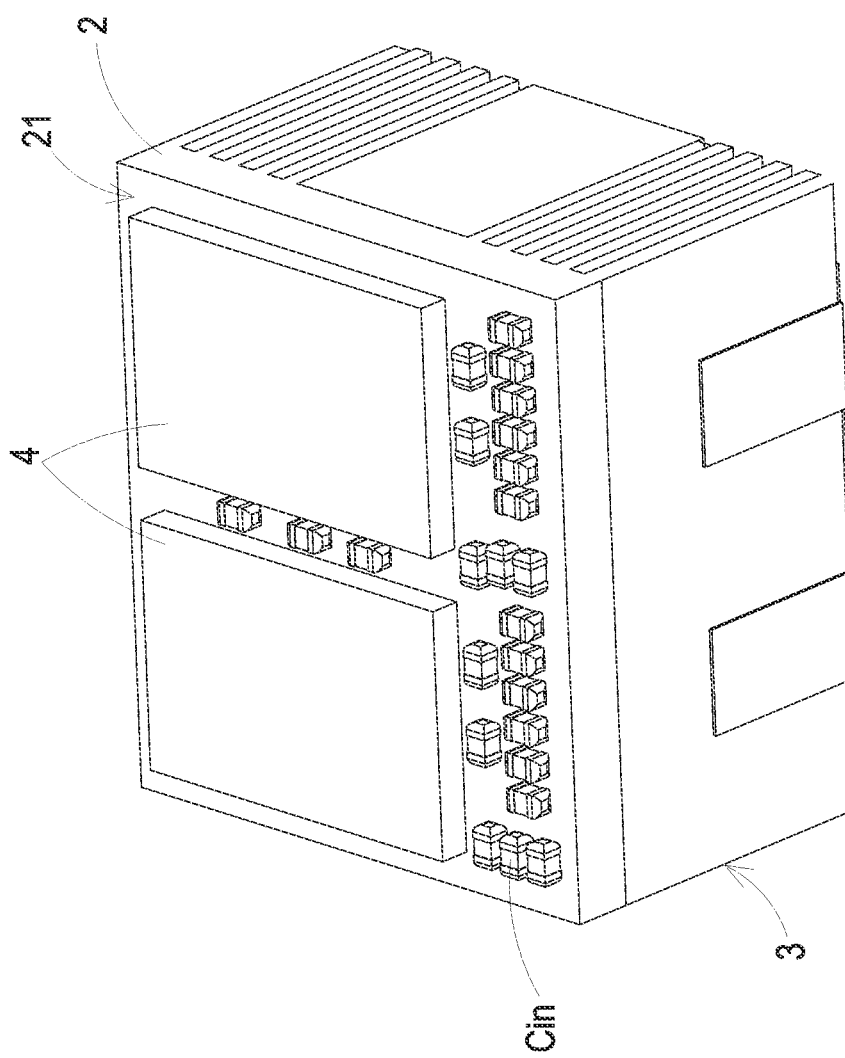
FIG. 8A is a schematic assembled view illustrating a power conversion module according to a third embodiment of the present disclosure.
Figure 8B:
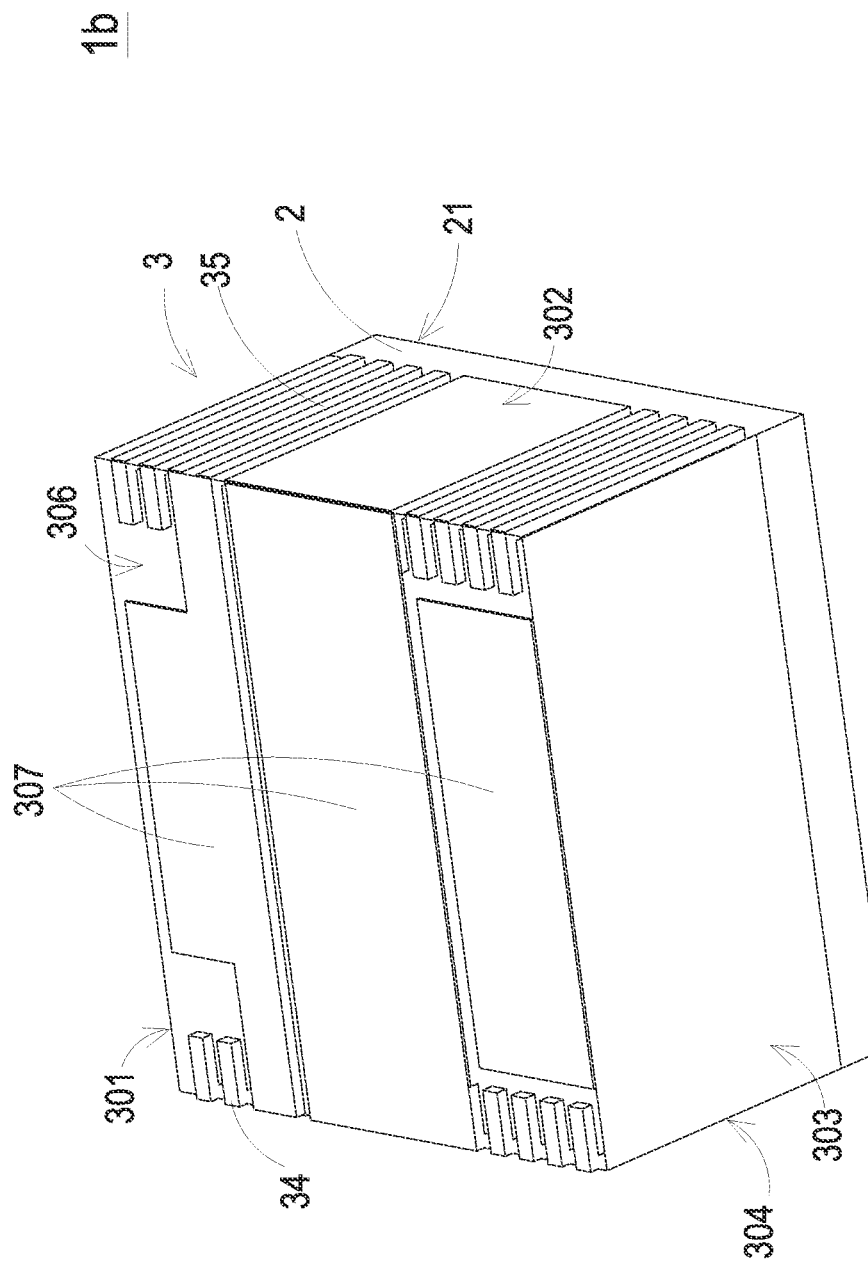
FIG. 8B is a schematic assembled view illustrating the power conversion module as shown in FIG. 8A and taken along another viewpoint

FIG. 8A is a schematic assembled view illustrating a power conversion module according to a third embodiment of the present disclosure. FIG. 8B is a schematic assembled view illustrating the power conversion module as shown in FIG. 8A and taken along another viewpoint. In comparison with the power conversion module 1 of the first embodiment, the power conversion module 1b in this embodiment includes the first circuit board 2 and the magnetic device 3 only. That is, the power conversion module 1b omits the second circuit board. Consequently, the overall height of the power conversion module 1b is reduced, and the power density of the power conversion module 1b is increased. In this embodiment, a plurality of contact pads 307 are formed on the sixth surface 306 of the magnetic device 3 of the power conversion module 1b. The contact pads 307 are used to replace the signal transferring function of the second circuit board. That is, the positive input signal, the ground power signal and the positive output signal can be transferred through the contact pads 307. In an embodiment, a portion of the first electroplating structure 34 and a portion of the second electroplating structure 35 are connected with each other through the contact pads 307.

In an embodiment, the total area of the plurality of contact pads 307 is greater than 50% (or even larger than 80%) of the area of the sixth surface 306 of the magnetic device 3. In an embodiment, the plurality of contact pads 307 are formed by laminating copper bars on the sixth surface 306 of the magnetic device 3. For example, a first surface of the copper bar is laminated on the powder magnetic material, and a second surface of the copper bar is welded on the system board. Consequently, the power conversion module is fixed on the system board, and electrically connected with the system board. The contact pad formed by the copper bar has a large area, and thus the air between the magnetic device 3 and the system board is eliminated. Consequently, the thermal resistance between the magnetic device 3 and the system board is reduced, the vertical thermal resistance between the switch component 4 and the system board is reduced, and the vertical thermal resistance between the switch component 4 and the heat sink is also reduced.

Figure 9A:
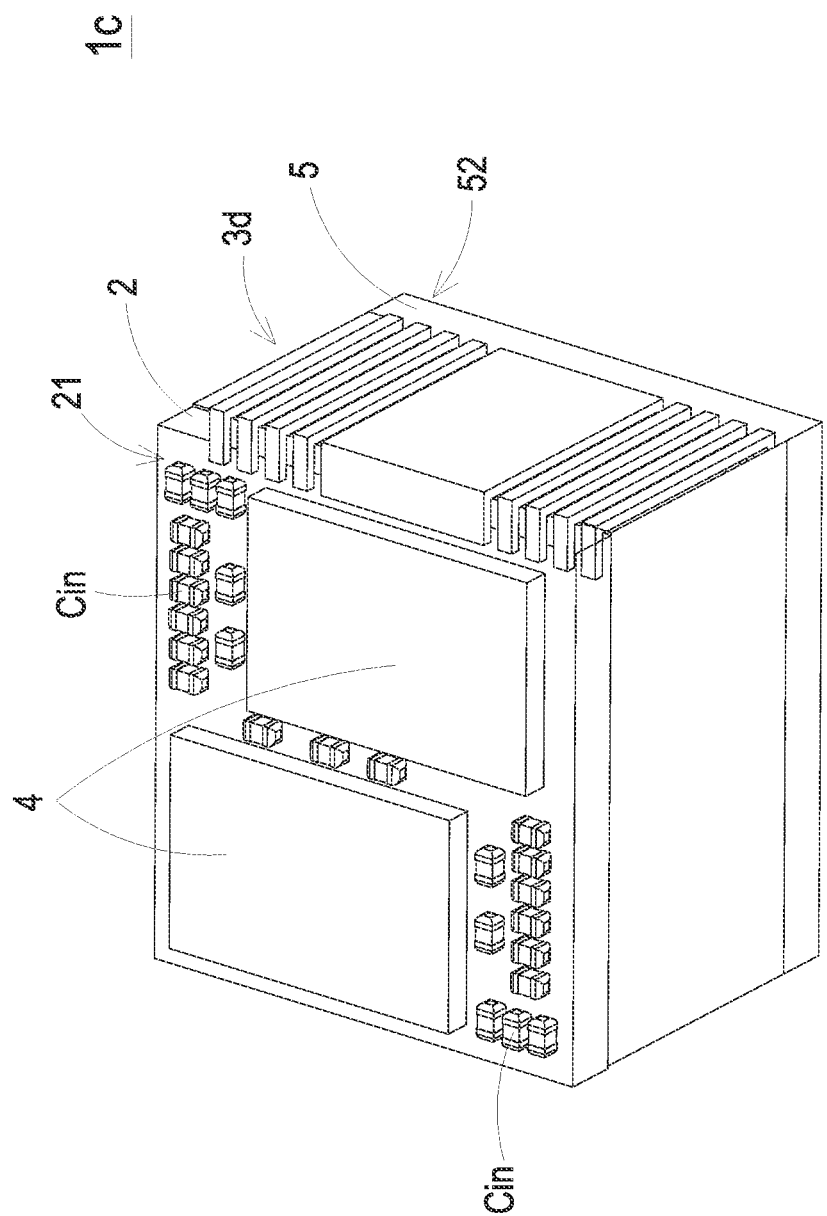
FIG. 9A is a schematic assembled view illustrating a power conversion module according to a fourth embodiment of the present disclosure.
Figure 9B:
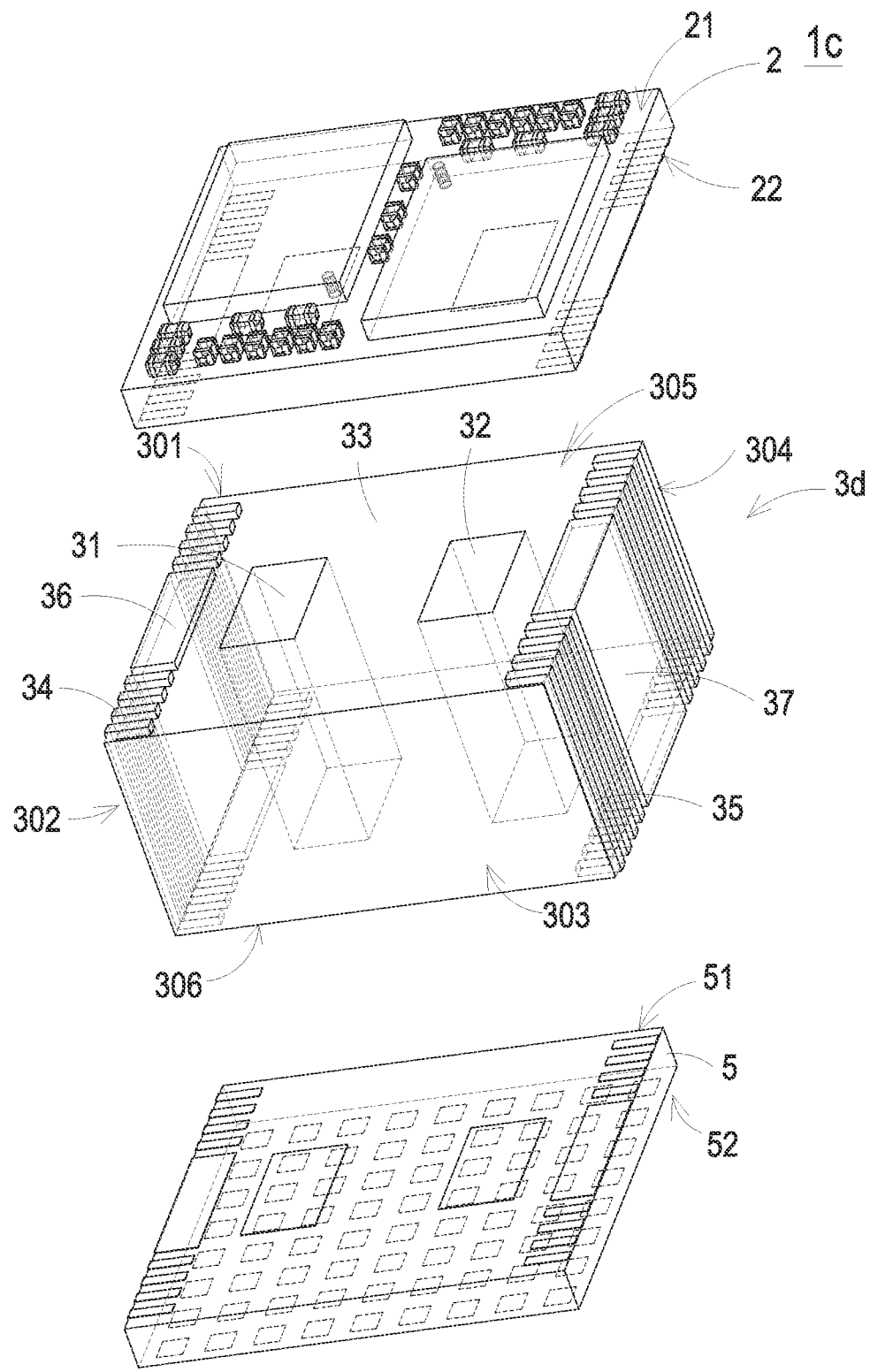
FIG. 9B is a schematic exploded view illustrating the power conversion module as shown in FIG. 9A.

Please refer to FIGS. 9A and 9B. FIG. 9A is a schematic assembled view illustrating a power conversion module according to a fourth embodiment of the present disclosure. FIG. 9B is a schematic exploded view illustrating the power conversion module as shown in FIG. 9A. In comparison with the power conversion module 1 of the first embodiment, the two switch components 4 of the power conversion module 1c in this embodiment are arranged along a diagonal line of the first circuit board 2. The plurality of input capacitors Cin are disposed on the first surface 21 of the first circuit board 2. In addition, a plurality of input capacitors Cin are located beside the two switch components 4. The input capacitors Cin are electrically connected with the switch components 4 through the conductive traces of the first circuit board 2.

Figure 10A:
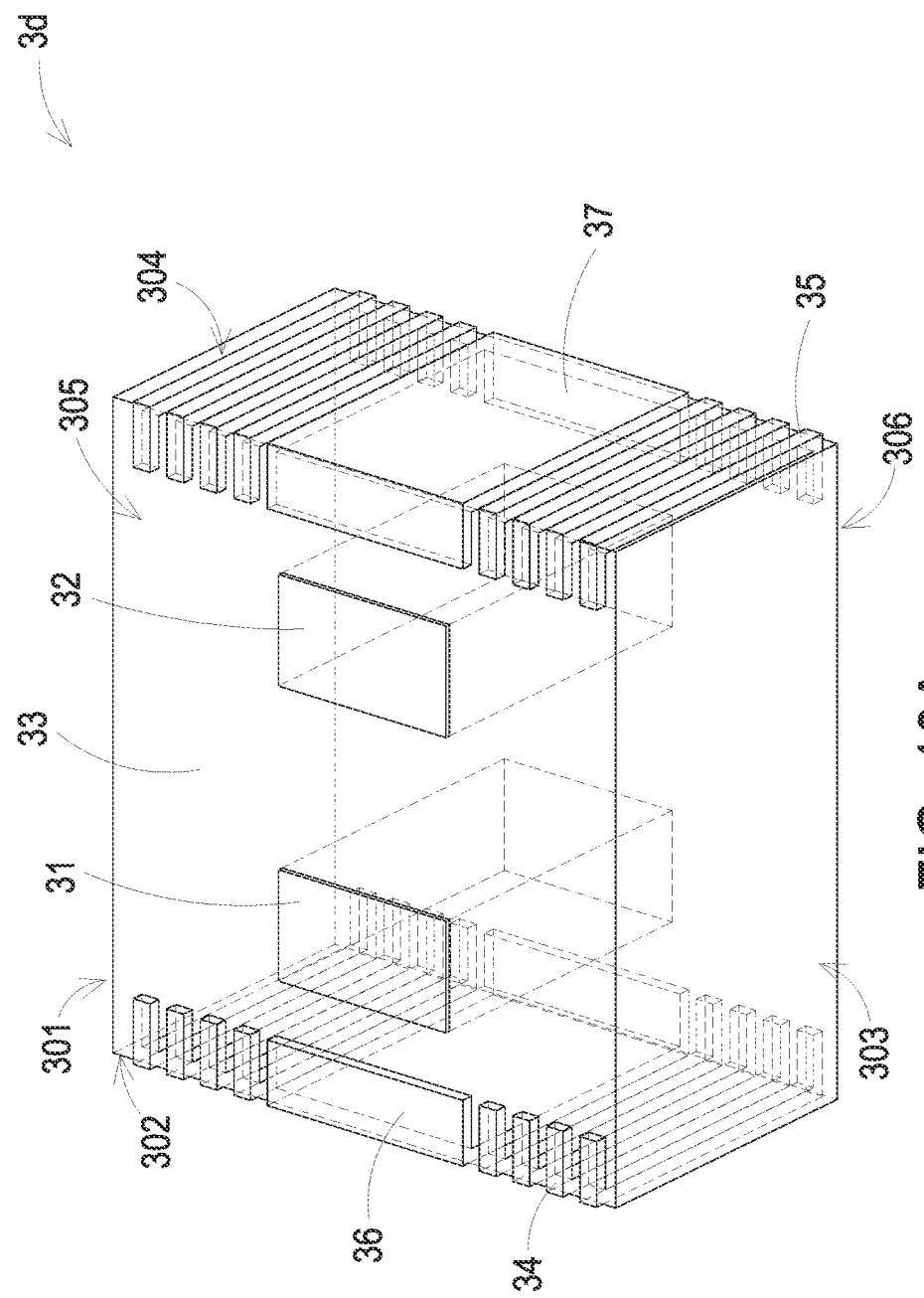
FIG. 10A is a schematic perspective view illustrating a first exemplary structure of the magnetic device of the power conversion module as shown in FIG. 9A.
Figure 10B:
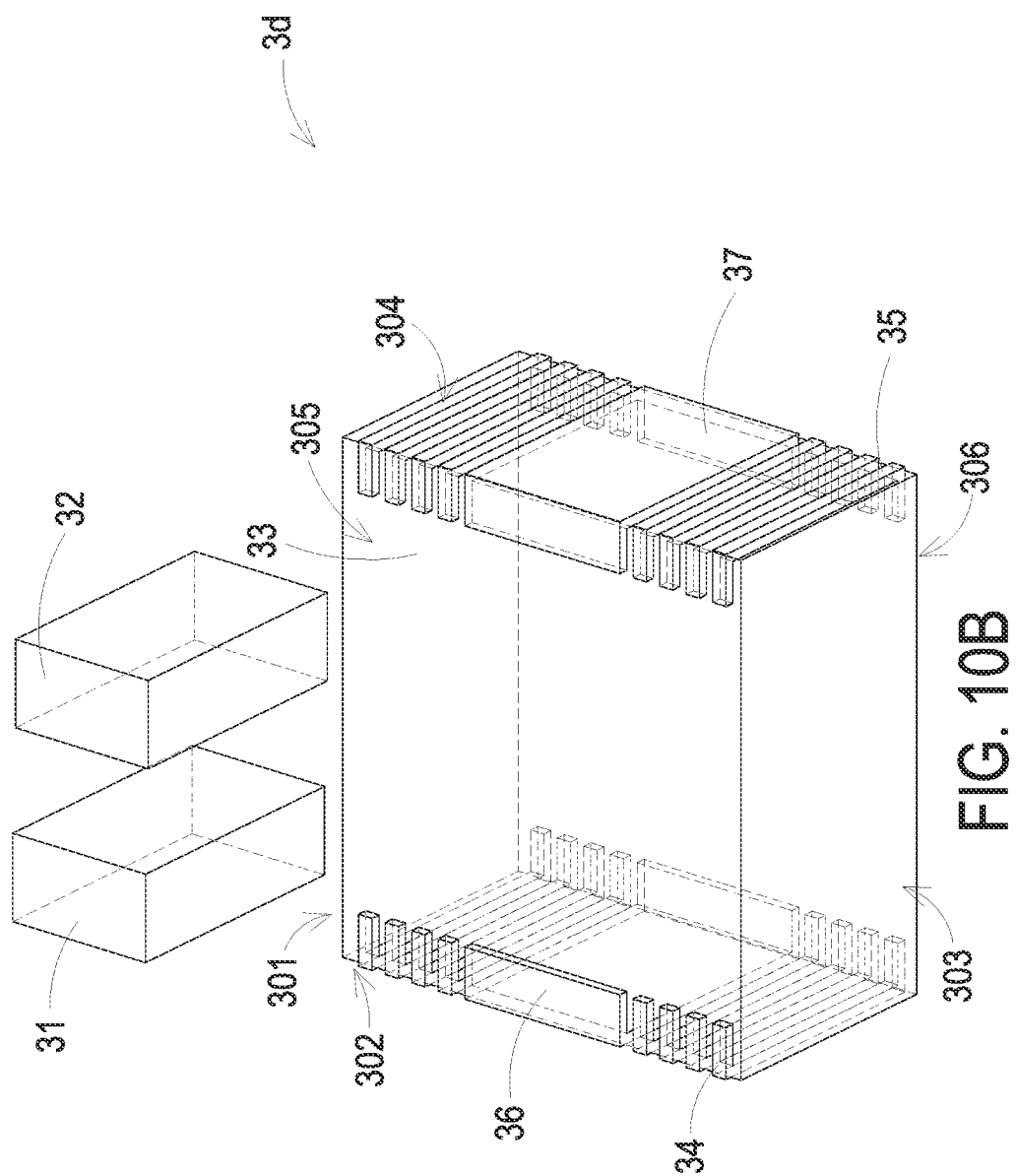
FIG. 10B is a schematic exploded view illustrating the magnetic device as shown in FIG. 10A.

FIG. 10A is a schematic perspective view illustrating a first exemplary structure of the magnetic device of the power conversion module as shown in FIG. 9A. FIG. 10B is a schematic exploded view illustrating the magnetic device as shown in FIG. 10A. The structure of the magnetic device 3d of the power conversion module 1c will be described as follows. The first conductive structure 31 of the magnetic device 3d has a cuboid structure. The first end of the first conductive structure 31 is exposed to the fifth surface 305 of the magnetic device 3d. In addition, the first end of the first conductive structure 31 is used as an input terminal of the magnetic device 3d. Moreover, the first end of the first conductive structure 31 is connected with the switch component 4 through the conductive traces of the first circuit board 2. The second end of the first conductive structure 31 is exposed to the sixth surface 306 of the magnetic device 3d. In addition, the second end of the first conductive structure 31 is used as an output terminal of the magnetic device 3d. The first conductive structure 31 is extended in the direction from the fifth surface 305 of the magnetic device 3d to the sixth surface 306 of the magnetic device 3d. The angle between the first conductive structure 31 and the fifth surface 305 of the magnetic device 3d is in the range between 60 degrees and 120 degrees, e.g., 90 degrees. The angle between the first conductive structure 31 and the sixth surface 306 of the magnetic device 3d is in the range between 60 degrees and 120 degrees, e.g., 90 degrees.

The second conductive structure 32 of the magnetic device 3d also has a cuboid structure. The second conductive structure 32 is in parallel with the first conductive structure 31. A first end of the second conductive structure 32 is exposed to the fifth surface 305 of the magnetic device 3d. In addition, the first end of the second conductive structure 32 is used as an input terminal of the magnetic device 3d. Moreover, the first end of the second conductive structure 32 is connected with the switch component 4 through the conductive traces of the first circuit board 2. A second end of the second conductive structure 32 is exposed to the sixth surface 306 of the magnetic device 3d. In addition, the second end of the second conductive structure 32 is used as an output terminal of the magnetic device 3d. The second conductive structure 32 is extended in the direction from the fifth surface 305 of the magnetic device 3d to the sixth surface 306 of the magnetic device 3d. The angle between the second conductive structure 32 and the fifth surface 305 of the magnetic device 3d is in the range between 60 degrees and 120 degrees, e.g., 90 degrees. The angle between the second conductive structure 32 and the sixth surface 306 of the magnetic device 3d is in the range between 60 degrees and 120 degrees, e.g., 90 degrees.

Further, the first conductive structure 31 and the second conductive structure 32 of the magnetic device 3d are perpendicularly connected between the fifth surface 305 and the sixth surface 306 of the magnetic device 3d. Since the paths of the windings formed by the first conductive structure 31 and the second conductive structure 32 are very short, the parasitic resistances and the conducting loss of the windings will be reduced.

Figure 11A:
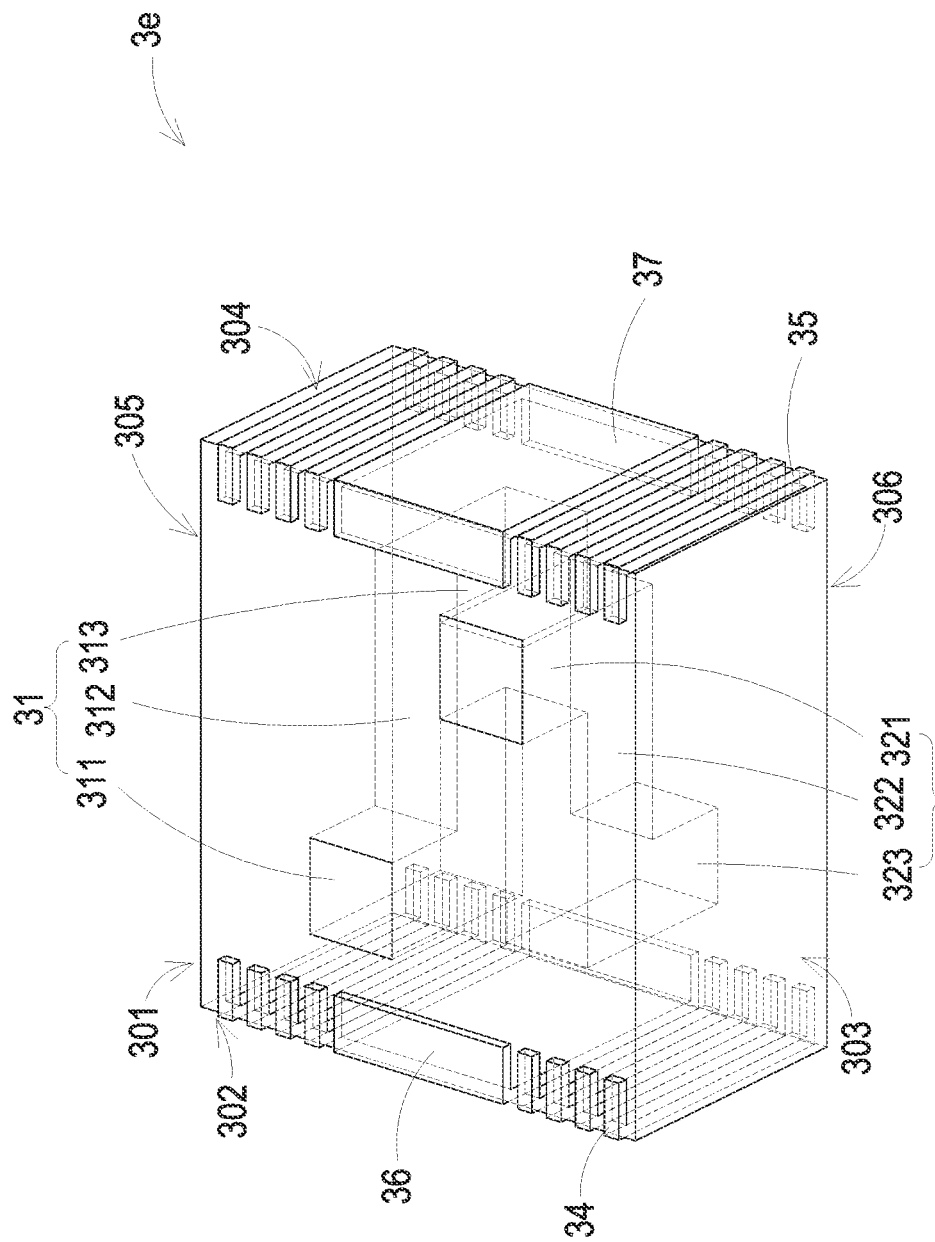
FIG. 11A is a schematic perspective view illustrating a second exemplary structure of the magnetic device of the power conversion module as shown in FIG. 9A.
Figure 11B:
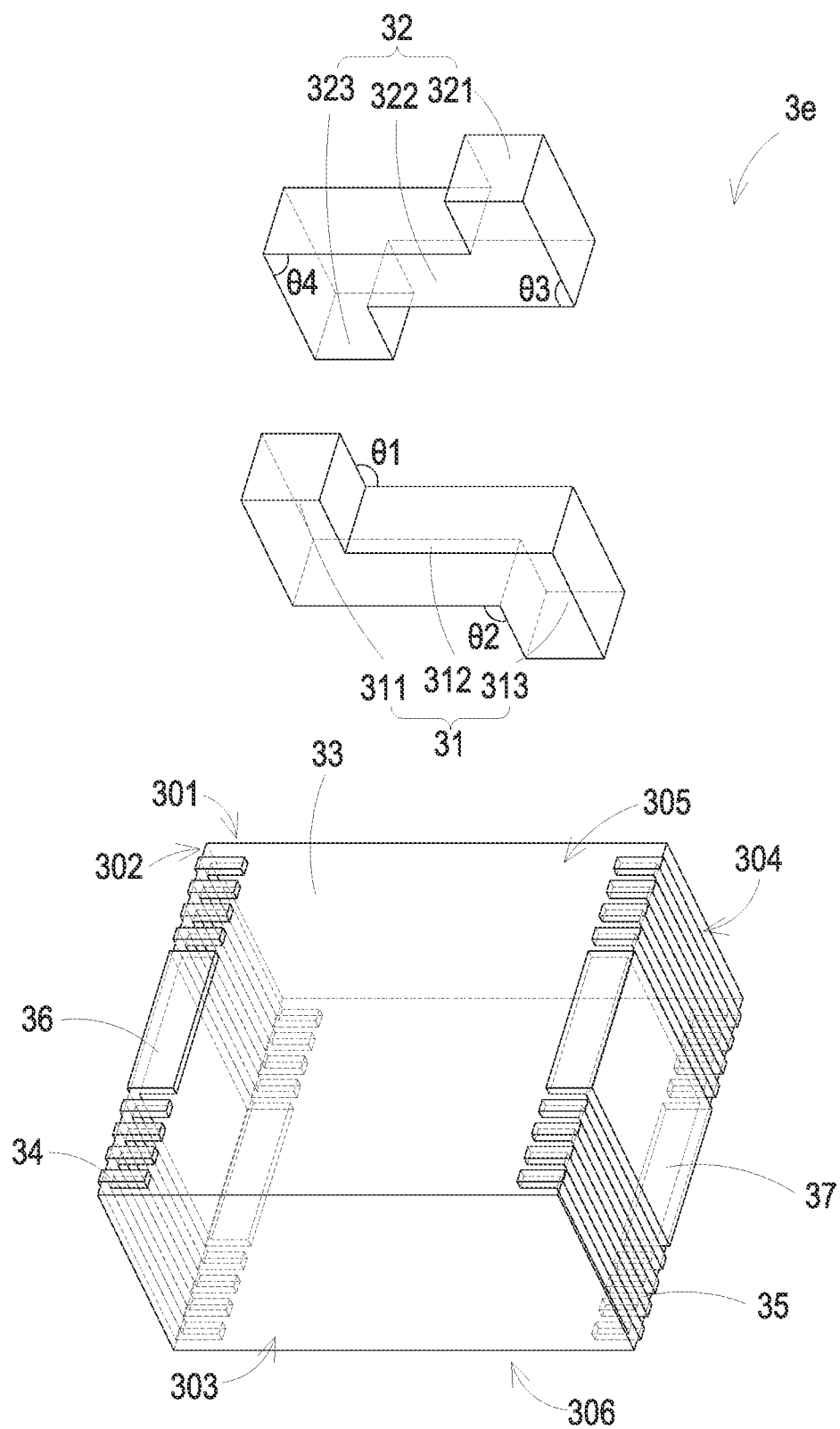
FIG. 11B is a schematic exploded view illustrating the magnetic device as shown in FIG. 11A.

FIG. 11A is a schematic perspective view illustrating a second exemplary structure of the magnetic device of the power conversion module as shown in FIG. 9A. FIG. 11B is a schematic exploded view illustrating the magnetic device as shown in FIG. 11A. In this embodiment, the first conductive structure 31 of the magnetic device 3e includes a first connection part 311, a conductive body 312 and a second connection part 313. The first connection part 311 is used as the input terminal of the first conductive structure 31. In addition, a portion of the first connection part 311 is exposed to the fifth surface 305 of the magnetic device 3e. The first connection part 311 is extended in the direction from the fifth surface 305 of the magnetic device 3e to the sixth surface 306 of the magnetic device 3e. The first conductive body 312 is connected between the first connection part 311 and the second connection part 313. A first end of the first conductive body 312 is connected with the first connection part 311. The first conductive body 312 is extended in the direction from the second surface 302 of the magnetic device 3e to the fourth surface 304 of the magnetic device 3e. The angle θ1 between the first conductive body 312 and the first connection part 311 is in the range between 60 degrees and 120 degrees as shown in FIG. 11B. In the embodiment, the angle θ1 between the first conductive body 312 and the first connection part 311 is 90 degrees, so that the first conductive body 312 is in parallel with the fifth surface 305 and the sixth surface 306 of the magnetic device 3e. The second connection part 313 is used as the output terminal of the first conductive structure 31. In addition, a portion of the second connection part 313 is exposed to the sixth surface 306 of the magnetic device 3e. The second connection part 313 is connected with the second end of the first conductive body 312. The second connection part 313 is extended in the direction from the fifth surface 305 of the magnetic device 3e to the sixth surface 306 of the magnetic device 3e. The angle θ2 between the second connection part 313 and the first conductive body 312 is in the range between the 60 degrees and the 120 degrees as shown in FIG. 11B. In the embodiment, the angle θ2 between the second connection part 313 and the first conductive body 312 is 90 degrees.

The second conductive structure 32 of the magnetic device 3e in this embodiment includes a third connection part 321, a second conductive body 322 and a fourth connection part 323. The third connection part 321 is used as the input terminal of the second conductive structure 32. In addition, a portion of the third connection part 321 is exposed to the fifth surface 305 of the magnetic device 3e. The third connection part 321 is extended in the direction from the fifth surface 305 of the magnetic device 3e to the sixth surface of the magnetic device 3e. The second conductive body 322 is connection between the third connection part 321 and the fourth connection part 323. A first end of the second conductive body 322 is connected with the third connection part 321. The second conductive body 322 is extended in the direction from the fourth surface 304 of the magnetic device 3e to the second surface 302 of the magnetic device 3e. The angle θ3 between the second conductive body 322 and the third connection part 321 is in the range between the 60 degrees and 120 degrees as shown in FIG. 11B. In the embodiment, the angle θ3 between the second conductive body 322 and the third connection part 321 is 90 degrees, so that the second conductive body 322 is in parallel with the fifth surface 305 and the sixth surface 306 of the magnetic device 3e. The fourth connection part 323 is used as the output terminal of the second conductive structure 32. In addition, a portion of the fourth connection part 323 is exposed to the sixth surface 306 of the magnetic device 3e. The fourth connection part 323 is connected with a second end of the second conductive body 322. The fourth connection part 323 is extended in the direction from the fifth surface 305 of the magnetic device 3e to the sixth surface 306 of the magnetic device 3e. The angle θ4 between the fourth connection part 323 and the second conductive body 322 is in the range between the 60 degrees and 120 degrees as shown in FIG. 11B. In the embodiment, the angle θ4 between the fourth connection part 323 and the second conductive body 322 is 90 degrees.

Since each of the first conductive structure 31 and the second conductive structure 32 has many bent regions, the frequency of the AC magnetic flux generated by the powder magnetic material 33 of the magnetic device 3e is increased, and the amplitude is reduced. Consequently, the equivalent output inductance of the power conversion module is largely increased, and the output ripple is largely reduced.

Figure 12:
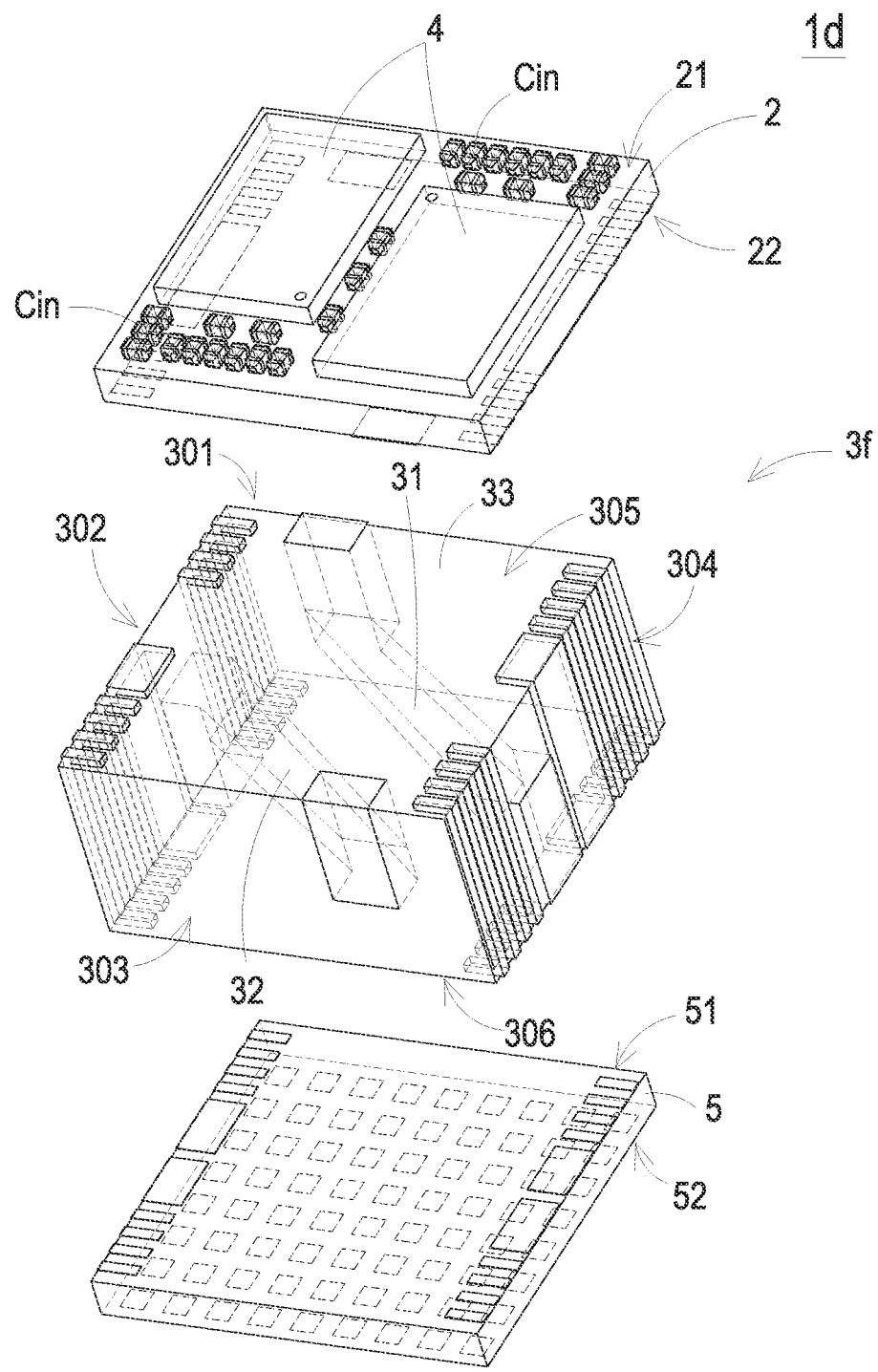
FIG. 12 is a schematic exploded view illustrating a power conversion module according to a fifth embodiment of the present disclosure.

FIG. 12 is a schematic exploded view illustrating a power conversion module according to a fifth embodiment of the present disclosure. In comparison with the power conversion module 1 of the first embodiment, the two switch components 4 of the power conversion module 1d in this embodiment are arranged along a diagonal line of the first circuit board 2. The plurality of input capacitors Cin are disposed on the first surface 21 of the first circuit board 2. In addition, a plurality of input capacitors Cin are located beside the two switch components 4. The input capacitors Cin are electrically connected with the switch components 4 through the conductive traces of the first circuit board 2.

Figure 13A:
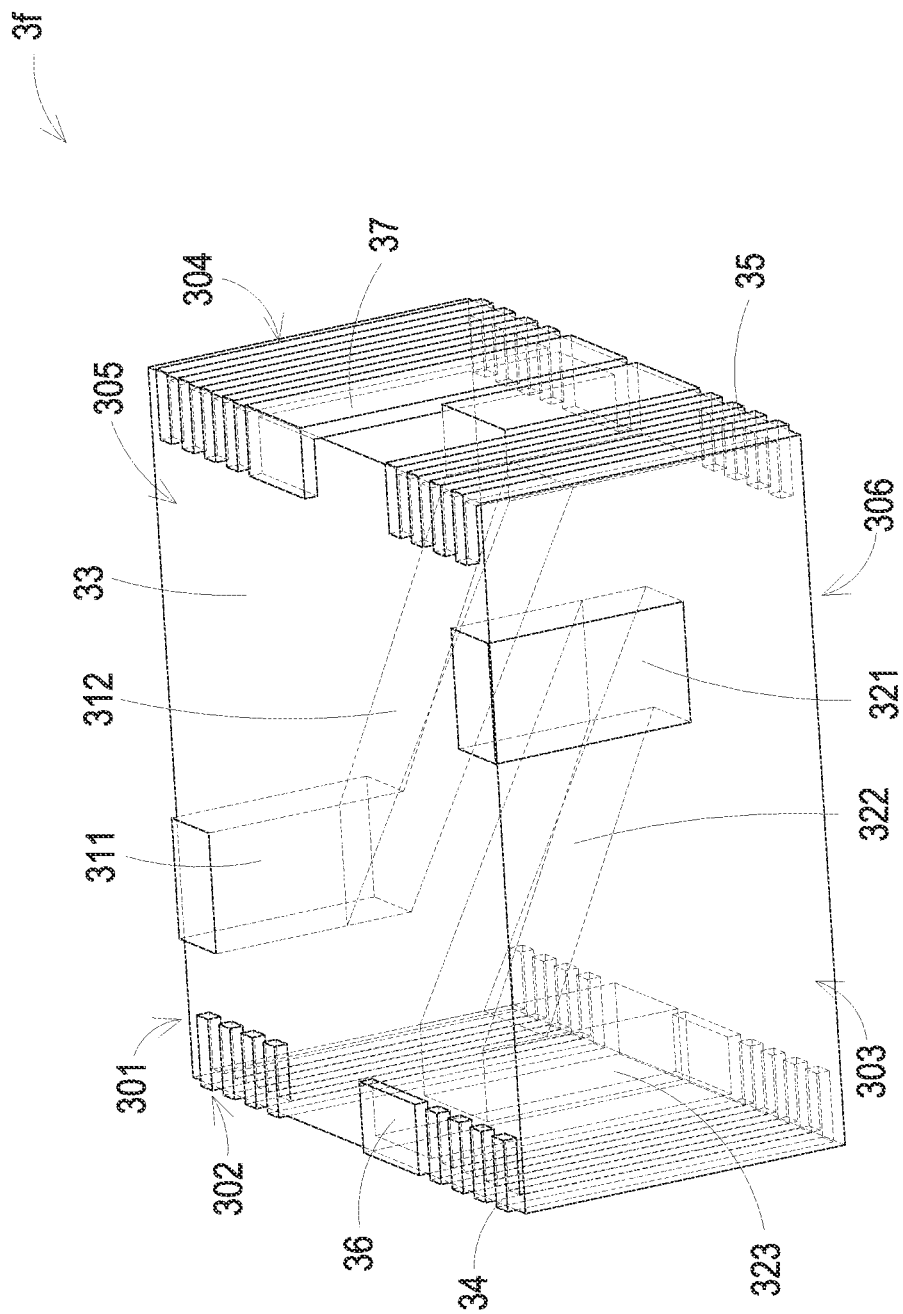
FIG. 13A is a schematic perspective view illustrating the structure of a magnetic device of the power conversion module as shown in FIG. 12.
Figure 13B:
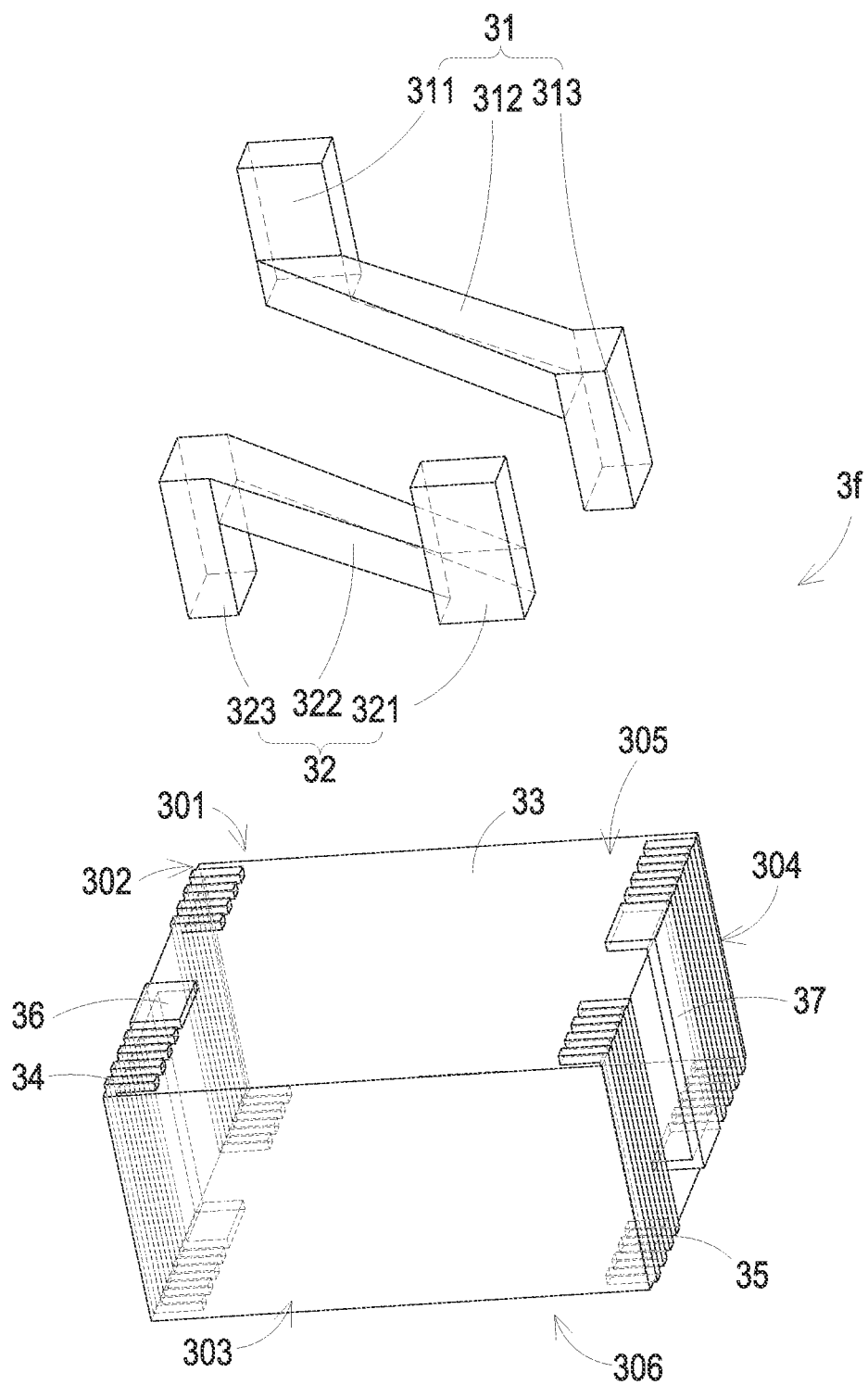
FIG. 13B is a schematic exploded view illustrating the magnetic device as shown in FIG. 13A.

FIG. 13A is a schematic perspective view illustrating the structure of a magnetic device of the power conversion module as shown in FIG. 12. FIG. 13B is a schematic exploded view illustrating the magnetic device as shown in FIG. 13A. The structure of the magnetic device 3f of the power conversion module 1d will be described as follows.

The first conductive structure 31 of the magnetic device 3f includes a first connection part 311, a first conductive body 312 and a second connection part 313. The first connection part 311 is used as the input terminal of the first conductive structure 31. The first connection part 311 is located beside the first surface 301 and the fifth surface 305 of the magnetic device 3f. In addition, a portion of the first connection part 311 is exposed to the first surface 301 and the fifth surface 305 of the magnetic device 3f. The first connection part 311 is extended in the direction from the fifth surface 305 of the magnetic device 3f to the sixth surface 306 of the magnetic device 3f. The first conductive 312 is connected between the first connection part 311 and the second connection part 313. A first end of the first conductive body 312 is connected with the first connection part 311. The first conductive body 312 is extended in the direction from the first surface 301 of the magnetic device 3f to the fourth surface 304 of the magnetic device 3f. The second connection part 313 is used as the output terminal of the first conductive structure 32. The second connection part 313 is located beside the fourth surface 304 and the sixth surface 306 of the magnetic device 3f. In addition, a portion of the second connection part 313 is exposed to the fourth surface 304 and the sixth surface 306 of the magnetic device 3f. The second connection part 313 is connected with a second end of the first conductive body 312. The second connection part 313 is extended in the direction from the fifth surface 305 of the magnetic device 3f to the sixth surface 306 of the magnetic device 3f.

The second conductive structure 32 is spaced from the first conductive structure 31. The second conductive structure 32 includes a third connection part 321, a second conductive body 322 and a fourth connection part 323. The third connection part 321 is used as the input terminal of the second conductive structure 32. The third connection part 321 is located beside the third surface 303 and the fifth surface 305 of the magnetic device 3f. In addition, a portion of the third connection part 321 is exposed to the third surface 303 and the fifth surface 305 of the magnetic device 3f. The third connection part 321 is extended in the direction from the fifth surface 305 of the magnetic device 3f to the sixth surface 306 of the magnetic device 3f. The second conductive body 322 is connected between the third connection part 321 and the fourth connection part 323. A first end of the second conductive body 322 is connected with the third connection part 321. The second conductive body 322 is extended in the direction from the third surface 303 of the magnetic device 3f to the second surface 302 of the magnetic device 3f. The fourth connection part 323 is used as the output terminal of the second conductive structure 32. The fourth connection part 323 is located beside the second surface 302 and the sixth surface 306 of the magnetic device 3f. In addition, a portion of the fourth connection part 323 is exposed to the second surface 302 and the sixth surface 306 of the magnetic device 3f. The fourth connection part 323 is connected with a second end of the second conductive body 322. The fourth connection part 323 is extended in the direction from the fifth surface 305 of the magnetic device 3f to the sixth surface 306 of the magnetic device 3f. The DC magnetic fluxes generated by the first conductive structure 31 and the second conductive structure 32 are superposed on the region of the powder magnetic material 33 between the first conductive structure 31 and the second conductive structure 32. The AC magnetic fluxes generated by the first conductive structure 31 and the second conductive structure 32 are cancelled out on the region of the powder magnetic material 33 between the first conductive structure 31 and the second conductive structure 32. Consequently, the equivalent output inductance of the power conversion module is largely increased, and the output ripple is largely reduced.

Figure 14A:
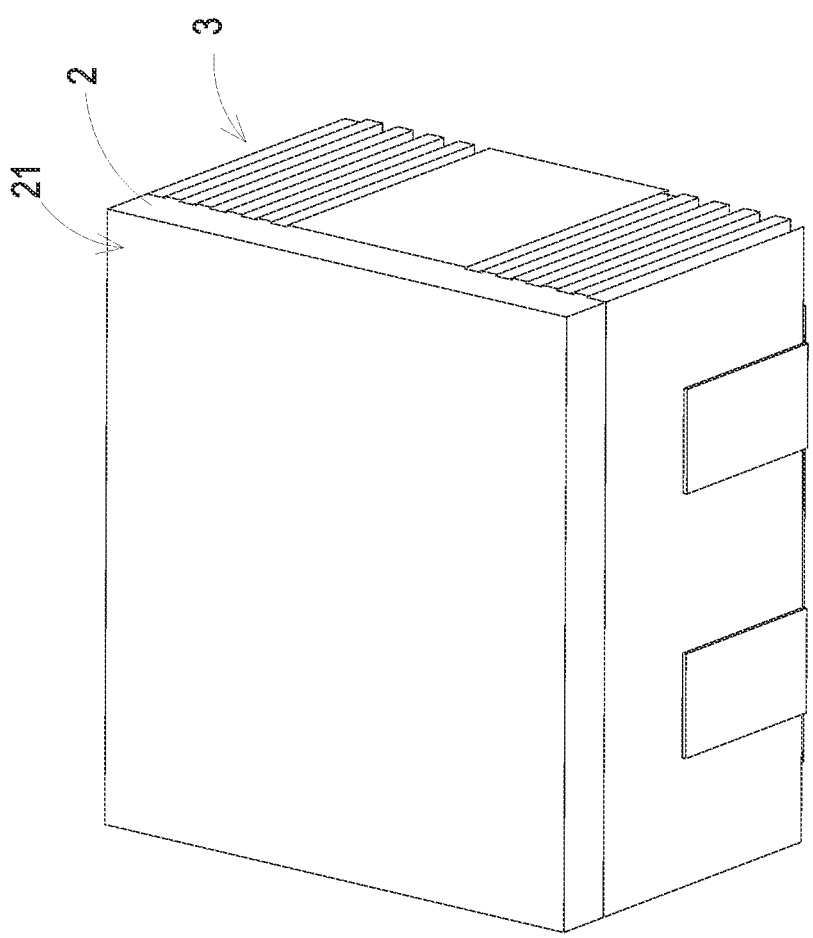
FIG. 14A is a schematic assembled view illustrating a power conversion module according to a sixth embodiment of the present disclosure.
Figure 14B:
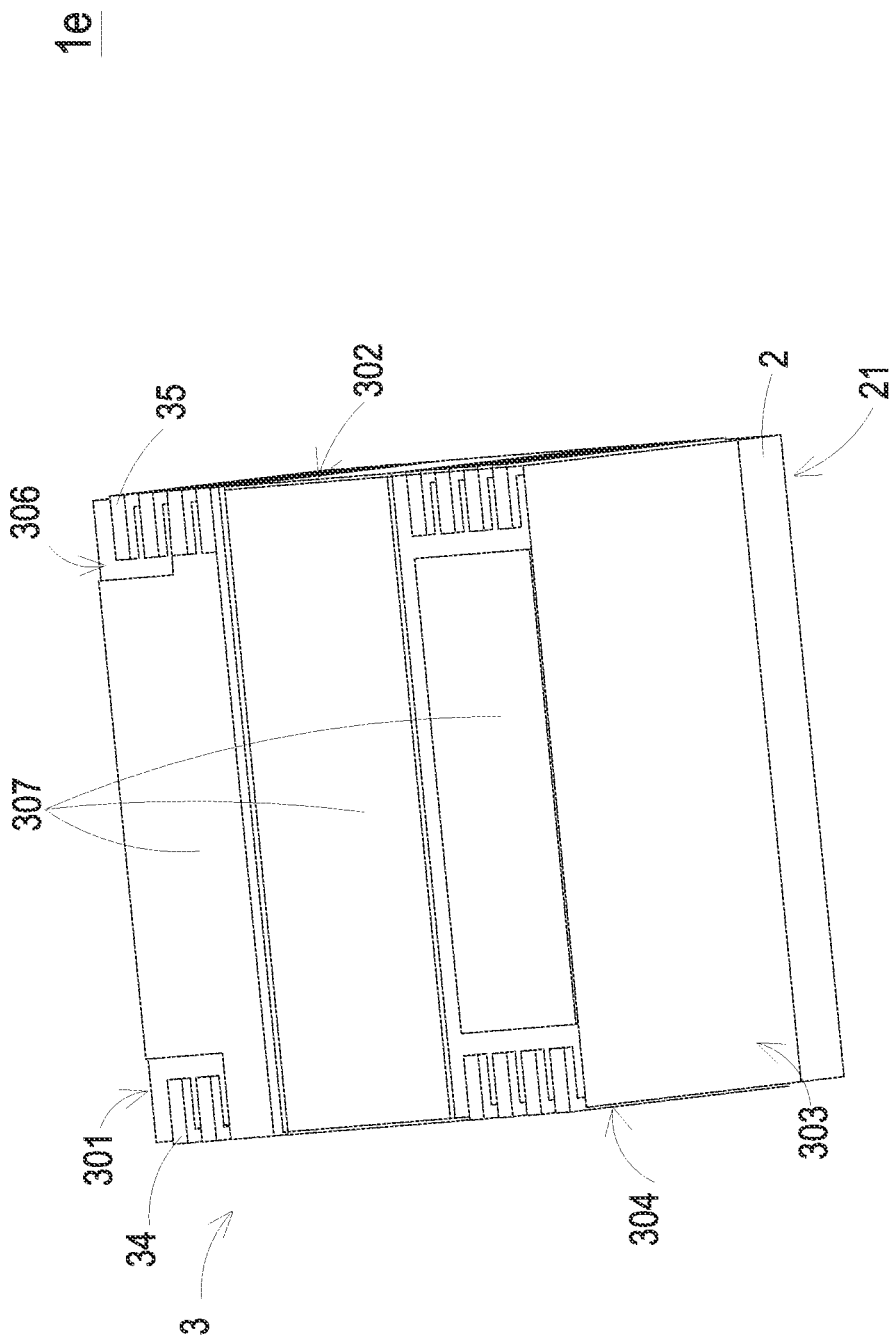
FIG. 14B is a schematic assembled view illustrating the power conversion module as shown in FIG. 14A and taken along another viewpoint.
Figure 14C:
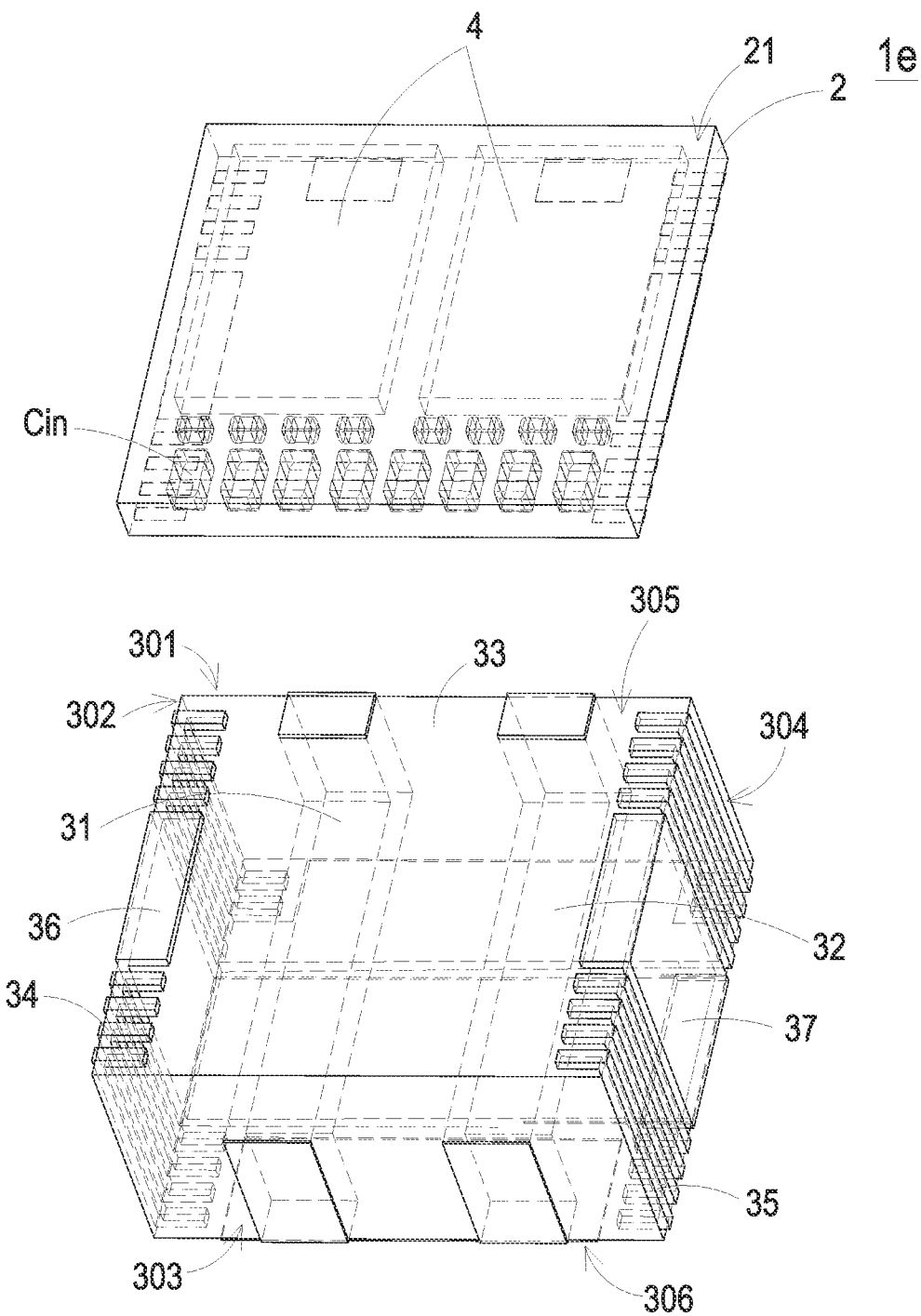
FIG. 14C is a schematic exploded view illustrating the power conversion module as shown in FIG. 14A.

FIG. 14A is a schematic assembled view illustrating a power conversion module according to a sixth embodiment of the present disclosure. FIG. 14B is a schematic assembled view illustrating the power conversion module as shown in FIG. 14A and taken along another viewpoint. FIG. 14C is a schematic exploded view illustrating the power conversion module as shown in FIG. 14A. In comparison with the power conversion module 1b as shown in FIGS. 8A and 8B, the switch components 4 and the input capacitor Cin of the power conversion module 1e in this embodiment are embedded in the first circuit board 2. Consequently, the overall height of the power conversion module 1e is effectively reduced. Moreover, the heat dissipation pad and the heat sink can be attached on the first surface 21 of the first circuit board 2 more easily and placed on the power conversion module 1e evenly. In another embodiment, the switch components 4 and the input capacitor Cin are combined with the first circuit board 2 as a package structure through encapsulation material. In this way, the overall height of the power conversion module 1e is effectively reduced, and the heat dissipation pad and the heat sink are attached on the first surface 21 of the first circuit board 2 more easily.

Figure 15A:
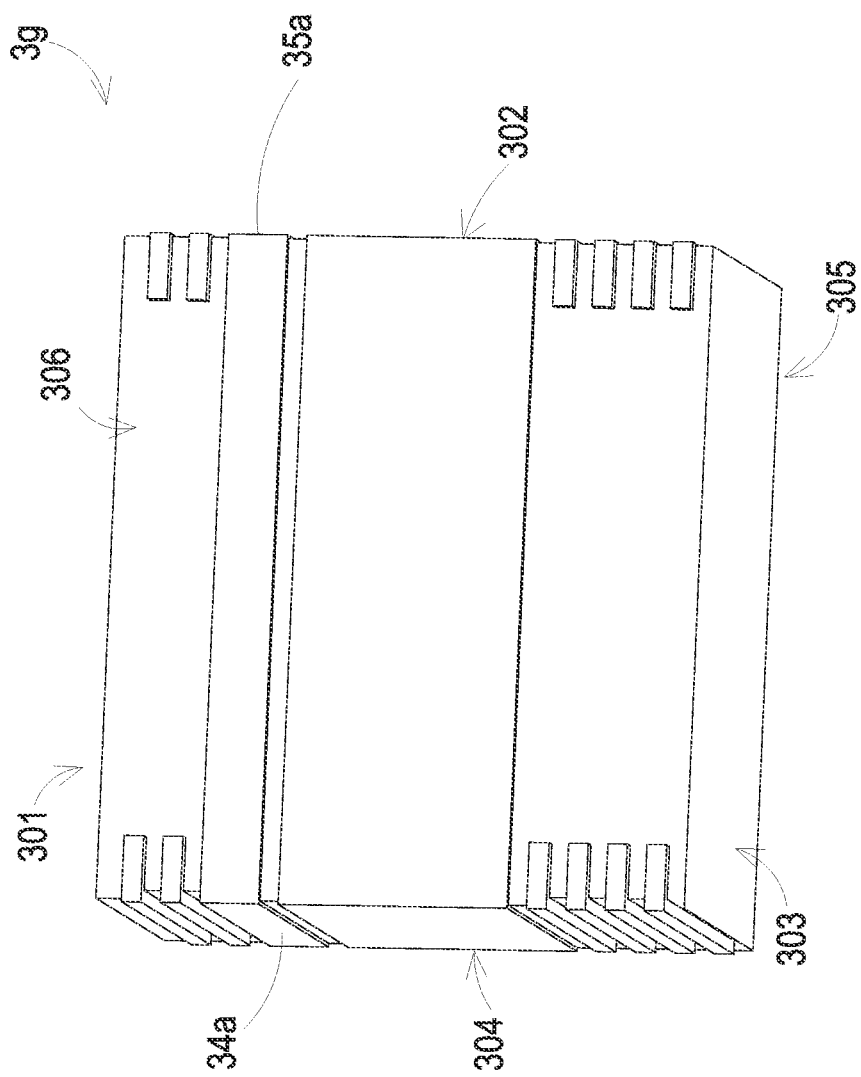
FIG. 15A is a schematic perspective view illustrating the structure of a magnetic device of a power conversion module according to a seventh embodiment of the present disclosure.
Figure 15B:
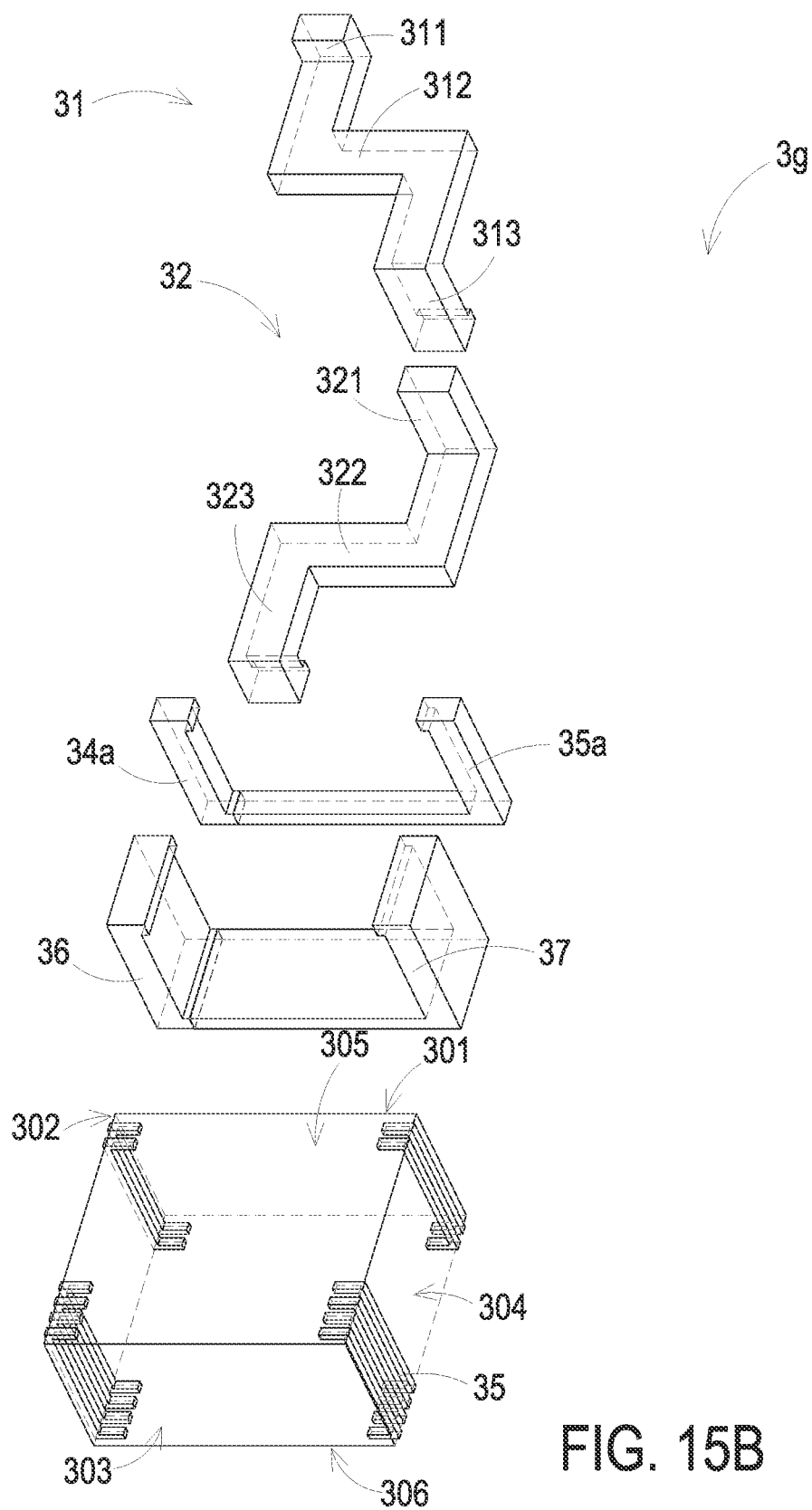
FIG. 15B is a schematic exploded view illustrating the magnetic device as shown in FIG. 15A.

FIG. 15A is a schematic perspective view illustrating the structure of a magnetic device of a power conversion module according to a seventh embodiment of the present disclosure. FIG. 15B is a schematic exploded view illustrating the magnetic device as shown in FIG. 15A. In comparison with the magnetic device 3b as shown in FIGS. 5A and 5B, portions of the first sub-electroplating conductive parts 34a of the first electroplating structure 34 and portions of the second sub-electroplating conductive parts 35a of the second electroplating structure 35 of the magnetic device 3g of this embodiment are made of pre-formed conductors. The first sub-electroplating conductive parts 34a and the second sub-electroplating conductive parts 35a on the fifth surface 305 of the magnetic device 3g have bent segments, respectively. The first sub-electroplating conductive parts 34a and the second sub-electroplating conductive parts 35a on the sixth surface 306 of the magnetic device 3g have bent segments, respectively, so that the first sub-electroplating conductive parts 34a and the second sub-electroplating conductive parts 35a on the sixth surface 306 of the magnetic device 3g are connected with each other. In addition, the third conductive structure 36 and the fourth conductive structure 37 on the fifth surface 305 and the sixth surface 306 of the magnetic device 3g have bent segments, respectively. The third conductive structure 36 and the fourth conductive structure 37 on the sixth surface 306 of the magnetic device 3g are connected with each other. In some embodiments, the first electroplating structure 34, the second electroplating structure 35, the third conductive structure 36 and the fourth conductive structure 37 are made of copper bars. By bending the copper bars, large-area contact pads are formed by the first electroplating structure 34, the second electroplating structure 35, the third conductive structure 36 and the fourth conductive structure 37 on the fifth surface 305 and the sixth surface 306 of the magnetic device 3g for transferring the signal from the input terminal or transferring the power signal to grounding. By utilizing the above structure, the air between the first electroplating structure 34 and the second electroplating structure 35 on the fifth surface 305 and the sixth surface 306 of the magnetic device 3g and the circuit board is eliminated. In some embodiments, the first connection part 311 of the first conductive structure 31 and the third connection part 321 of the second conductive structure 32 have bent segments, respectively. Consequently, the area of the first connection part 311 and the third connection part 321 exposed to the fifth surface 305 is increased. In addition, the second connection part 313 of the first conductive structure 31 and the fourth connection part 323 of the second conductive structure 32 have bent segments, respectively. Consequently, the area of the second connection part 313 and the fourth connection part 323 exposed to the sixth surface 306 is increased. That is, the first conductive structure 31 and the second conductive structure 32 are made of copper bars. By bending the copper bars, the connection parts and the conductive bodies are formed and the bending segments are formed on the fifth surface 305 and the sixth surface 306, so that large-area contact pads are formed.

The vertical thermal resistance of the magnetic device 3g is low. Moreover, a heat sink may be attached on the magnetic device 3g to increase the heat dissipation efficiency. In an embodiment, the total area of the plurality of contact pads on the sixth surface 306 is larger than 50% (or even larger than 80%) of the area of the sixth surface 306 of the magnetic device 3g. In an embodiment, the plurality of contact pads 307 are formed by laminating copper bars on the powder magnetic material. For example, a first surface of the copper bar is laminated on the powder magnetic material, and a second surface of the copper bar is welded on the system board. Consequently, the power conversion module is fixed on the system board, and electrically connected with the system board. The contact pad formed by the copper bar has a large area, and thus the air between the magnetic device 3g and the system board is eliminated. Consequently, the thermal resistance between the magnetic device 3g and the system board is reduced, the vertical thermal resistance between the switch component 4 and the system board is reduced, and the vertical thermal resistance between the switch component 4 and the heat sink is also reduced.

Figure 16A:
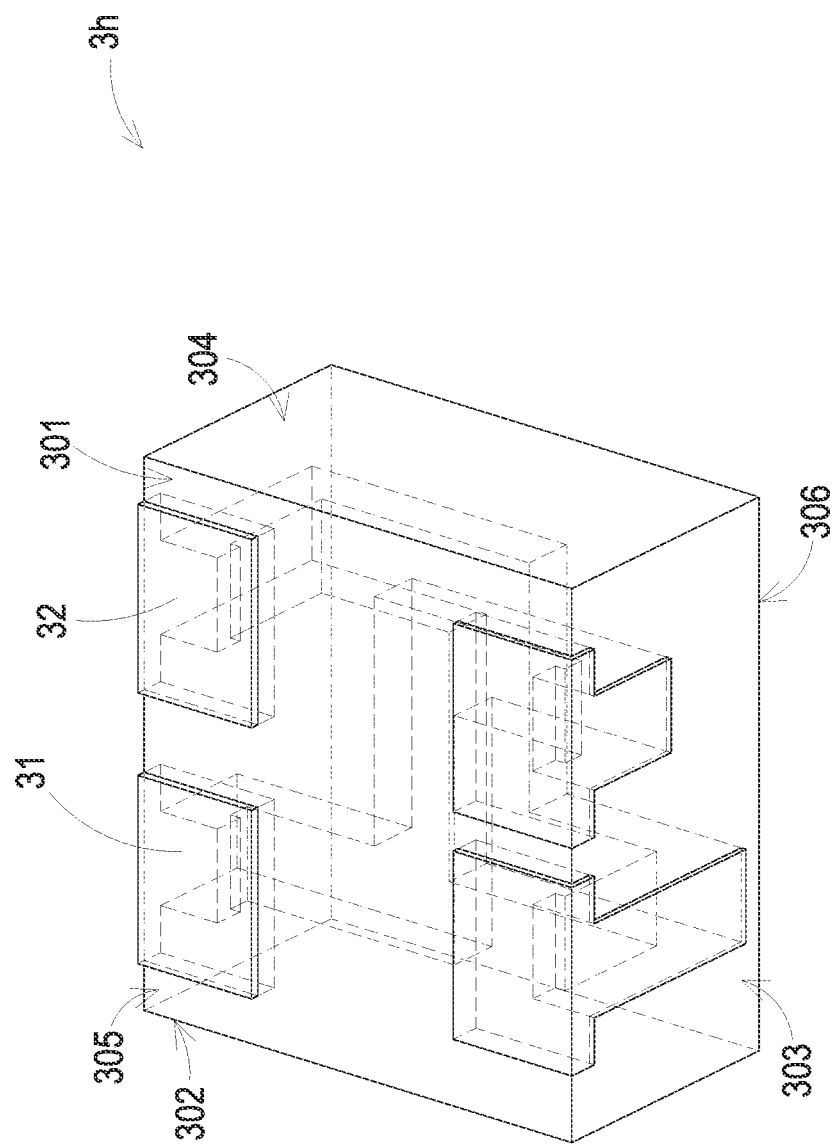
FIG. 16A is a schematic perspective view illustrating the structure of a magnetic device of a power conversion module according to an eighth embodiment of the present disclosure.
Figure 16B:
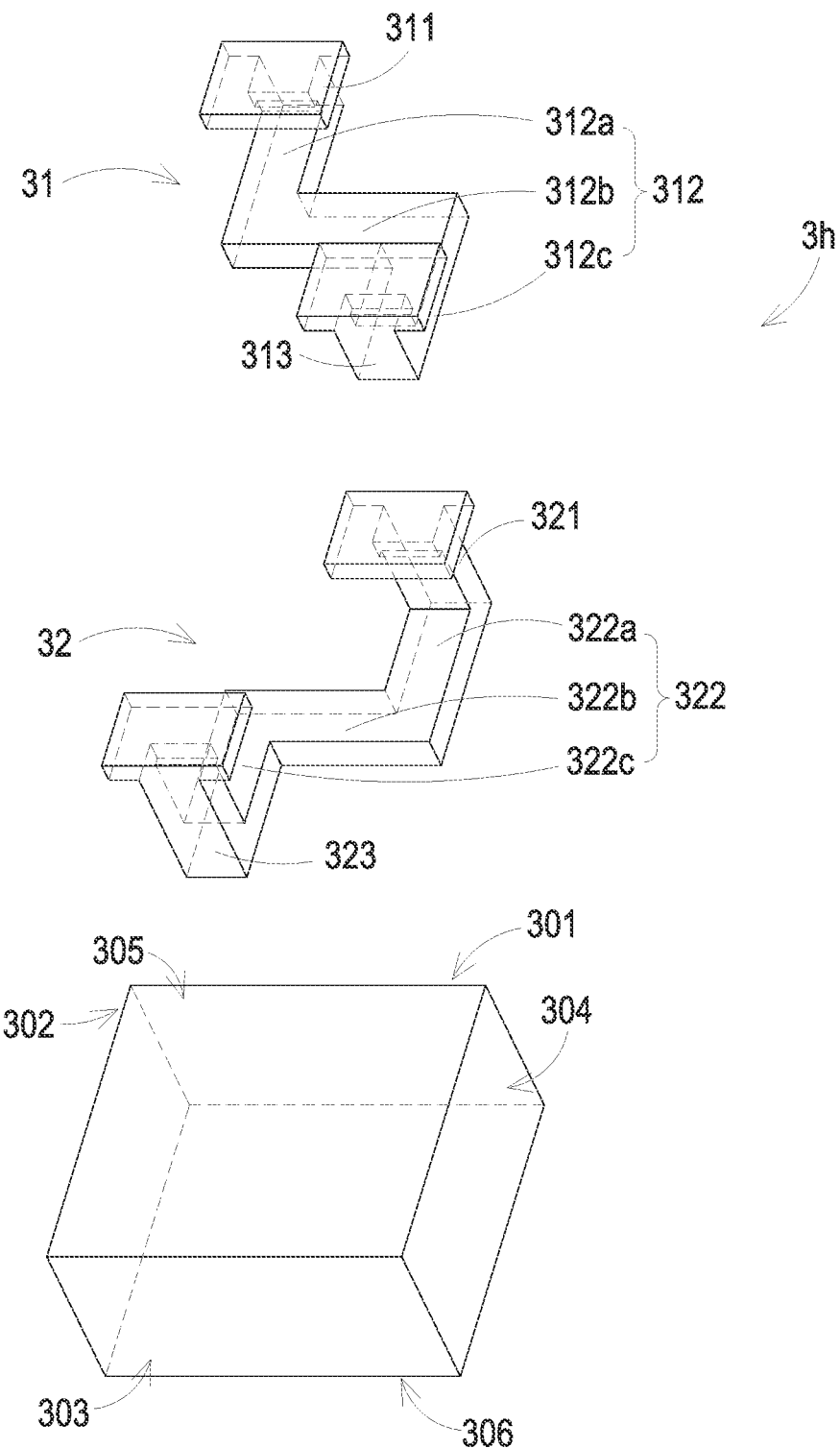
FIG. 16B is a schematic exploded view illustrating the magnetic device as shown in FIG. 16A.

FIG. 16A is a schematic perspective view illustrating the structure of a magnetic device of a power conversion module according to an eighth embodiment of the present disclosure. FIG. 16B is a schematic exploded view illustrating the magnetic device as shown in FIG. 16A. In comparison with the magnetic device 3 as shown in FIGS. 3A and 3B, the first conductive body 312 of the first conductive structure 31 of the magnetic device 3h in this embodiment includes a first extension part 312a, a second extension part 312b and a third extension part 312c. A first end of the first extension part 312a is connected with the first connection part 311. The first extension part 312a is extended in the direction from the first surface 301 of the magnetic device 3h to the third surface 303 of the magnetic device 3h. A first end of the second extension part 312b is connected with a second end of the first extension part 312a. The second extension part 312b is extended in the direction from the second surface 302 of the magnetic device 3h to the fourth surface 304 of the magnetic device 3h. A first end of the third extension part 312c is connected with a second end of the second extension part 312b. The third extension part 312c is extended in the direction from the first surface 301 of the magnetic device 3h to the third surface 303 of the magnetic device 3h. The second connection part 313 is connected with a second end of the third extension part 312c. The second connection part 313 is extended in the direction from the sixth surface 306 of the magnetic device 3h to the fifth surface 305 of the magnetic device 3h. In this embodiment, the first connection part 311 and the second connection part 313 of the first conductive structure 31 have bent segments, respectively. The bent segments are exposed to the fifth surface 305 or the sixth surface 306 of the magnetic device 3h. The bent segments can be used as large-area contact pads of the first connection part 311 and the second connection part 313, respectively. The bent segments are electrically connected with the second surface 22 of the first circuit board 2, respectively.

In comparison with the magnetic device 3 as shown in FIGS. 3A and 3B, the second conductive body 322 of the second conductive structure 32 of the magnetic device 3h in this embodiment further includes a fourth extension part 322a, a fifth extension part 322b and a sixth extension part 322c. A first end of the fourth extension part 322a is connected with the third connection part 321. The fourth extension part 322a is extended in the direction from the first surface 301 of the magnetic device 3h to the third surface 303 of the magnetic device 3h. A first end of the fifth extension part 322b is connected with a second end of the fourth extension part 322a. The fifth extension part 322b is extended in the direction from the fourth surface 304 of the magnetic device 3h to the second surface 302 of the magnetic device 3h. A first end of the sixth extension part 322c is connected with a second end of the fifth extension part 322b. The sixth extension part 322c is extended in the direction from the first surface 301 of the magnetic device 3h to the third surface 303 of the magnetic device 3h. The fourth connection part 323 is connected with a second end of the sixth extension part 322c. The fourth connection part 323 is extended in the direction from the sixth surface 306 of the magnetic device 3h to the fifth surface 305 of the magnetic device 3h. In this embodiment, the third connection part 321 and the fourth connection part 323 of the second conductive structure 32 have bent segments. The bent segments are exposed to the fifth surface 305 or the sixth surface 306 of the magnetic device 3h. The bent segments can be used as large-area contact pads of the third connection part 321 and the fourth connection part 323, respectively (This embodiment takes the fifth surface 305 as an example).

The vertical thermal resistance of the magnetic device 3g is low. Moreover, a heat sink may be attached on the magnetic device 3g to increase the heat dissipation efficiency. In an embodiment, the total area of the plurality of contact pads on the fifth surface 305 is larger than 50% (or even larger than 80%) of the area of the fifth surface 305 of the magnetic device 3g. The plurality of contact pads on the fifth surface 305 are electrically connected with the first surface 21 and the second surface 22 of the first circuit board 2. In some embodiments, the switch components 4 and the magnetic device 3h are disposed on the two opposed sides of the first circuit board 2. In some other embodiments, the switch components 4 and the magnetic device 3h are disposed on the same side of the first circuit board 2, and the switch components 4 are disposed between the first circuit board 2 and the magnetic device 3h. The above arrangement of the magnetic device 3h can make the vertical thermal resistance of the magnetic device 3h lower, and a better heat dissipation effect can be achieved when a heat sink is additionally provided. In an embodiment, the plurality of contact pads 307 are formed by laminating copper bars on the powder magnetic material. For example, a first surface of the copper bar is laminated on the powder magnetic material, and a second surface of the copper bar is welded on the system board. Consequently, the power conversion module is fixed on the system board, and electrically connected with the system board. The contact pad formed by the copper bar has a large area, and thus the air between the magnetic device 3h and the system board is eliminated. Consequently, the thermal resistance between the magnetic device 3h and the system board is reduced, the vertical thermal resistance between the switch component 4 and the system board is reduced, and the vertical thermal resistance between the switch component 4 and the heat sink is also reduced.

It is noted that the magnetic devices of the above embodiments can be applied to different power conversion modules. That is, the applications of the magnetic devices of the above embodiments are not restricted.

From the above descriptions, the first conductive structure and the second conductive structure are used as the windings, and the powder magnetic material is used as the magnetic core. Consequently, it is not necessary to use an additional printed circuit board to install the windings and the magnetic core. In other words, the size tolerance of the printed circuit board is avoided, and the assembling tolerance between the printed circuit board and the magnetic core is eliminated. Consequently, the volume of the magnetic device is reduced, and the performance of the magnetic device is enhanced. For example, the inductance and the saturation current are increased, and the core loss and the winding loss are reduced. Moreover, the two connection parts of each of the first conductive structure and the second conductive structure are exposed to the two opposite surfaces of the magnetic device, and the first conductive body of the first conductive structure and the second conductive body of the second conductive structure are substantially perpendicular to the first surface and the third surface of the magnetic device. Since the magnetic force line passes through a long length and a large cross-sectional area (i.e., along the conductive bodies), the core loss of the powder magnetic material is lower and the saturation current capability of the magnetic core is high.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic device, comprising:
   a first conductive structure comprising a first connection part, a first conductive body and a second connection part, wherein the first conductive body is connected between the first connection part and the second connection part;
   a second conductive structure comprising a third connection part, a second conductive body and a fourth connection part, wherein the second conductive body is connected between the third connection part and the fourth connection part;
   a magnetic core formed of a powder magnetic material, wherein the powder magnetic material, the first conductive structure and the second conductive structure are laminated together to form a first surface, a second surface, a third surface, a fourth surface, a fifth surface and a sixth surface of the magnetic device, wherein the first conductive structure and the second conductive structure are embedded in the magnetic core, the first surface and the third surface are opposed to each other, the second surface and the fourth surface are opposed to each other, and the fifth surface and the sixth surface are opposed to each other, wherein both the first connection part and the third connection part are exposed to the fifth surface, and both the second connection part and the fourth connection part are exposed to the sixth surface, wherein the first connection part and the second connection part are further exposed to any two of the first surface, the second surface, the third surface and the fourth surface, and the third connection part and the fourth connection part are further exposed to any two of the first surface, the second surface, the third surface and the fourth surface;
   a first electroplating structure formed on the second surface, the fifth surface and the sixth surface; and
   a second electroplating structure formed on the fourth surface, the fifth surface and the sixth surface.

2. The magnetic device according to claim 1, wherein the first conductive structure and the second conductive structure are spaced from each other.

3. The magnetic device according to claim 1, wherein the first connection part is exposed to the first surface and the fifth surface, the first connection part is extended in a direction from the fifth surface to the sixth surface, a first end of the first conductive body is connected with the first connection part, the first conductive body is extended in a direction from the first surface to the third surface, the second connection part is connected with a second end of the first conductive body, the second connection part is extended in a direction from the fifth surface to the sixth surface, and the second connection part is exposed to the third surface and the sixth surface, wherein the third connection part is exposed to the first surface and the fifth surface, the third connection part is extended in a direction from the fifth surface to the sixth surface, a first end of the second conductive body is connected with the third connection part, the second conductive body is extended in a direction from the first surface to the third surface, the fourth connection part is connected with a second end of the second conductive body, the fourth connection is extended in a direction from the fifth surface to the sixth surface, and the fourth connection part is exposed to the third surface and the sixth surface.

4. The magnetic device according to claim 3, wherein the magnetic device further comprises a ferrite structure, wherein the ferrite structure is embedded in the powder magnetic material, and the ferrite structure is arranged between the first conductive structure and the second conductive structure.

5. The magnetic device according to claim 1, wherein the first connection part is exposed to the first surface and the fifth surface, the first connection part is extended in a direction from the fifth surface to the sixth surface, and the first conductive body comprises a first extension part, a second extension part and a third extension part, wherein a first end of the first extension part is connected with the first connection part, the first extension part is extended in a direction from the first surface to the third surface, a first end of the second extension part is connected with a second end of the first extension part, the second extension part is extended in a direction from the second surface to the fourth surface, a first end of the third extension part is connected with a second end of the second extension part, and the third extension part is extended in a direction from the first surface to the third surface, wherein the second connection part is connected with a second end of the third extension part, the second connection part is extended in a direction from the fifth surface to the sixth surface, and the second connection part is exposed to the third surface and the sixth surface, wherein the third connection part is exposed to the first surface and the fifth surface, the third connection part is extended in a direction from the fifth surface to the sixth surface, and the second conductive body comprises a fourth extension part, a fifth extension part and a sixth extension part, wherein a first end of the fourth extension part is connected with the third connection part, the fourth extension part is extended in a direction from the first surface to the third surface, a first end of the fifth extension part is connected with a second end of the fourth extension part, the fifth extension part is extended in a direction from the fourth surface to the second surface, a first end of the sixth extension part is connected with a second end of the fifth extension part, and the sixth extension part is extended in a direction from the first surface to the third surface, wherein the fourth connection part is connected with a second end of the sixth extension part, the fourth connection part is extended in a direction from the fifth surface to the sixth surface, and the fourth connection part is exposed to the third surface and the sixth surface, wherein a length of the first connection part is shorter than a length of the third connection part, and a length of the second connection part is longer than a length of the fourth connection part.

6. The magnetic device according to claim 1, wherein the first connection part is exposed to the first surface and the fifth surface, the first connection part is extended in a direction from the fifth surface to the sixth surface, and the first conductive body comprises a first extension part, a second extension part, a third extension part, a fourth extension part, and a fifth extension, wherein a first end of the first extension part is connected with the first connection part, a first extension part is extended in a direction from the first surface to the third surface, a first end of the second extension part is connected with a second end of the first extension part, the second extension part is extended in a direction from the second surface to the fourth surface, a first end of the third extension part is connected with a second end of the second extension part, the third extension part is extended in a direction from the first surface to the third surface, a first end of the fourth extension part is connected with a second end of the third extension part, the fourth extension part is extended in a direction from the fourth surface to the second surface, a first end of the fifth extension part is connected with a second end of the fourth extension part, and the fifth extension part is extended in a direction from the first surface to the third surface, wherein the second connection part is connected with a second end of the fifth extension part, the second connection part is extended in a direction from the fifth surface to the sixth surface, and the second connection part is exposed to the third surface and the sixth surface, wherein the third connection part is exposed to the first surface and the fifth surface, the third connection part is extended in a direction from the fifth surface to the sixth surface, and the second conductive body comprises a sixth extension part, a seventh extension part, an eighth extension part, a ninth extension part and a tenth extension part, wherein a first end of the sixth extension part is connected with the third connection part, the sixth extension part is extended in a direction from the first surface to the third surface, a first end of the seventh extension part is connected with a second end of the sixth extension part, the seventh extension part is extended in a direction from the fourth surface to the second surface, a first end of the eighth extension part is connected with a second end of the seventh extension part, the eighth extension part is extended in a direction from the first surface to the third surface, a first end of the ninth connection part is connected with a second end of the eighth extension part, the ninth connection part is extended in a direction from the second surface to the fourth surface, a first end of the tenth extension part is connected with a second end of the ninth extension part, and the tenth extension part is extended in a direction from the first surface to the third surface, wherein the fourth connection part is connected with a second end of the tenth extension part, the fourth connection part is extended in a direction from the fifth surface to the sixth surface, and the fourth surface is exposed to the third surface and the sixth surface, wherein a length of the first connection part is shorter than a length of the third connection part, and a length of the second connection part is longer than a length of the fourth connection part.

7. The magnetic device according to claim 1, wherein the first connection part is exposed to the first surface and the fifth surface, the first connection part is extended in a direction from the fifth surface to the sixth surface, a first end of the first conductive body is connected with the first connection part, the first conductive body is extended in a direction from the first surface to the fourth surface, the second connection part is connected with a second end of the first conductive body, the second connection part is extended in a direction from the fifth surface to the sixth surface, and the second connection part is exposed to the fourth surface and the sixth surface, wherein the third connection part is exposed to the third surface and the fifth surface, the third connection part is extended in the direction from the fifth surface to the sixth surface, a first end of the second conductive body is connected with the third connection part, the second conductive body is extended in a direction from the third surface to the second surface, the fourth connection part is connected with a second end of the second conductive body, the fourth connection part is extended in a fifth surface to the sixth surface, and the fourth connection part is exposed to the second surface and the sixth surface.

8. The magnetic device according to claim 1, wherein the first connection part is exposed to the first surface and the fifth surface, the first connection part is extended in a direction from the fifth surface to the sixth surface, and the first conductive body comprises a first extension part, a second extension part and a third extension part, wherein a first end of the first extension part is connected with the first connection part, the first extension part is extended in a direction from the first surface to the third surface, a first end of the second extension part is connected with a second end of the first extension part, the second extension part is extended in a direction from the second surface to the fourth surface, a first end of the third surface is connected with a second end of the second extension part, the third extension part is extended in a direction from the first surface to the third surface, the second connection part is connected with a second end of the third extension part, the second connection part is extended in a direction from the sixth surface to the fifth surface, and the second connection part is exposed to the third surface and the fifth surface, wherein the third connection part is exposed to the first surface and the fifth surface, the third connection part is extended in a direction from the fifth surface to the sixth surface, and the second conductive body comprises a fourth extension part, a fifth extension part and a sixth surface, wherein a first end of the fourth extension part is connected with the third connection part, the fourth extension part is extended in a direction from the first surface to the third surface, a first end of the fifth extension part is connected with a second end of the fourth extension part, the fifth extension part is extended in a direction from the fourth surface to the second surface, a first end of the sixth extension part is connected with a second end of the fifth extension part, and the sixth extension part is extended in a direction from the first surface to the third surface, wherein the fourth connection part is connected with a second end of the sixth extension part, the fourth connection part is extended in the direction from the sixth surface to the fifth surface, and the fourth connection part is exposed to the third surface and the fifth surface of the magnetic device.

9. The magnetic device according to claim 8, wherein each of the first connection part and the second connection part of the first conductive structure has a bent segment used as a contact pad, and each of the third connection part and the fourth connection part of the second conductive structure has a bent segment used as another contact pad.

10. The magnetic device according to claim 1, wherein the magnetic device further comprises a plurality of contact pads, wherein the plurality of contact pads are formed on the fifth surface of the magnetic device and a total area of the plurality of contact pads on the fifth surface is larger than 50% of an area of the fifth surface of the magnetic device, or the plurality of contact pads are formed on the sixth surface of the magnetic device and a total area of the plurality of contact pads on the sixth surface is larger than 50% of an area of the sixth surface of the magnetic device.

11. The magnetic device according to claim 10, wherein the plurality of contact pads are formed by laminating copper bars on the fifth surface or the sixth surface of the magnetic device.

12. The magnetic device according to claim 1, wherein the first conductive structure and the second conductive structure are used as windings of the magnetic device to transfer power signals.

13. The magnetic device according to claim 1, wherein the magnetic device further comprises a third conductive structure and a fourth conductive structure, wherein the third conductive structure is disposed on the second surface of the magnetic device, the fourth conductive structure is disposed on the fourth surface of the magnetic device, and the third conductive structure and the fourth conductive structure are connected with a ground terminal.

14. The magnetic device according to claim 1, wherein the first electroplating structure and the second electroplating structure transfer control signals and power signals.

15. The magnetic device according to claim 1, wherein the first electroplating structure comprises a plurality of first sub-electroplating conductive parts, and the second electroplating structure comprises a plurality of second sub-electroplating conductive parts, wherein the plurality of first sub-electroplating conductive parts are in parallel with each other, and the plurality of second sub-electroplating conductive parts are in parallel with each other, wherein every two adjacent first sub-electroplating conductive parts of the plurality of first sub-electroplating conductive parts are formed as a differential signal pair, and every two adjacent second sub-electroplating conductive parts of the plurality of second sub-electroplating conductive parts are formed as another differential signal pair.

16. The magnetic device according to claim 15, wherein each of the first sub-electroplating conductive part and the second sub-electroplating conductive part on the fifth surface has a bent segment, and each of the first sub-electroplating conductive part and the second sub-electroplating conductive part on the sixth surface has a bent segment.

17. The magnetic device according to claim 1, wherein each of the first conductive structure and the second conductive structure is a one-piece structure.

18. The magnetic device according to claim 1, wherein the first electroplating structure and the second electroplating structure are thinner than the first conductive structure or the second conductive structure.

19. The magnetic device according to claim 1, wherein the powder magnetic material comprises a plurality of powder core particles, wherein each powder core particle is coated with an insulation material, and the insulation material is an organic coating agent or an inorganic coating agent.

20. A power conversion module, comprising:
a first circuit board having a first surface and a second surface, which are opposed to each other;
a magnetic device as claimed in claim 1, wherein the fifth surface of the magnetic device is bonded to the second surface of the first circuit board; and
two switch components disposed on the first circuit board, wherein the two switch components are respectively connected with the first connection part of the first conductive structure and the third connection part of the second conductive structure through conductive traces in the first circuit board.

21. The power conversion module according to claim 20, wherein the power conversion module further comprises a second circuit board having a first surface and a second surface, which are opposed to each other, wherein the first surface of the second circuit board is attached on the magnetic device, the second circuit board and the first circuit board are respectively disposed on two opposite sides of the magnetic device, and the second connection part of the first conductive structure and the fourth connection part of the second conductive structure are connected with a system board through conductive traces in the second circuit board.

22. The power conversion module according to claim 20, wherein the first circuit board further comprises a recess, and the recess is concavely formed from the second surface of the first circuit board, wherein the power conversion module further comprises a plurality of input capacitors, and the plurality of input capacitors are disposed within the recess of the first circuit board.

23. The power conversion module according to claim 20, wherein the power conversion module further comprises a plurality of input capacitors, wherein the plurality of input capacitors and the two switch components are disposed on the first surface of the first circuit board.

24. The power conversion module according to claim 20, wherein the power conversion module further comprises a plurality of input capacitors, wherein the plurality of input capacitors and the two switch components are embedded in the first circuit board.

25. The power conversion module according to claim 20, wherein the magnetic device further comprises a ferrite structure, wherein the ferrite structure is embedded in the powder magnetic material, and the ferrite structure is arranged between the first conductive structure and the second conductive structure.

26. A manufacturing process of a magnetic device, the manufacturing process comprising steps of:
(a) providing a first conductive structure and a second conductive structure, wherein the first conductive structure comprises a first connection part, a first conductive body and a second connection part, and the first conductive body is connected between the first connection part and the second connection part, wherein the second conductive structure comprises a third connection part, a second conductive body and a fourth connection part, and the second conductive body is connected between the third connection part and the fourth connection part;
(b) providing a powder magnetic material, and laminating the powder magnetic material, the first conductive structure and the second conductive structure together to form a first surface, a second surface, a third surface, a fourth surface, a fifth surface and a sixth surface of the magnetic device, wherein the first conductive structure and the second conductive structure are embedded in the powder magnetic material, wherein the first surface and the third surface are opposed to each other, the second surface and the fourth surface are opposed to each other, and the fifth surface and the sixth surface are opposed to each other;
(c) milling the powder magnetic material, wherein after the powder magnetic material is milled, the first connection part and the third connection part are exposed to the fifth surface of the magnetic device, the second connection part and the fourth connection part are exposed to the sixth surface of the magnetic device, the first connection part and the second connection part are exposed to any two of the first surface, the second surface, the third surface and the fourth surface of the magnetic device, and the third connection part and the fourth connection part are exposed to any two of the first surface, the second surface, the third surface and the fourth surface of the magnetic device;
(d) forming a first electroplating structure on the fifth surface, the second surface and the sixth surface of the magnetic device, and forming a second electroplating structure on the fifth surface, the fourth surface and the sixth surface of the magnetic device.

27. The manufacturing process according to claim 26, further comprising a step of annealing the magnetic device.

\* \* \* \* \*